(12) United States Patent
Suzuki et al.

(10) Patent No.: US 8,728,645 B2
(45) Date of Patent: May 20, 2014

(54) BATTERY PACK

(75) Inventors: Katsuhiro Suzuki, Kanagawa (JP);
Masayuki Enari, Kanagawa (JP);
Hidenori Minami, Kanagawa (JP)

(73) Assignee: Sony Corporation, Tokyo (JP)

( * ) Notice: Subject to any disclaimer, the term of this patent is extended or adjusted under 35 U.S.C. 154(b) by 367 days.

(21) Appl. No.: 12/036,652

(22) Filed: Feb. 25, 2008

(65) Prior Publication Data

US 2008/0241650 A1 Oct. 2, 2008

(30) Foreign Application Priority Data

Mar. 30, 2007 (JP) ................................. 2007-095329

(51) Int. Cl.
*H01M 2/10* (2006.01)

(52) U.S. Cl.
USPC .................. 429/97; 429/96; 429/98; 429/99; 429/100

(58) Field of Classification Search
USPC ........................................... 429/99, 122–347
See application file for complete search history.

(56) References Cited

U.S. PATENT DOCUMENTS

| 5,415,947 | A | * | 5/1995 | Mitsui et al. | 429/1 |
| 5,602,454 | A | * | 2/1997 | Arakawa et al. | 320/106 |
| 5,626,979 | A | * | 5/1997 | Mitsui et al. | 429/97 |

FOREIGN PATENT DOCUMENTS

| JP | 5-205712 | 8/1993 |
| JP | 2006-185822 | 7/2006 |

OTHER PUBLICATIONS

U.S. Appl. No. 12/037,434, filed Feb. 26, 2008, Suzuki, et al.

* cited by examiner

*Primary Examiner* — Kenneth Douyette
*Assistant Examiner* — James Lee
(74) *Attorney, Agent, or Firm* — Oblon, Spivak, McClelland, Maier & Neustadt, L.L.P.

(57) ABSTRACT

A battery pack is loaded and unloaded to and from a battery mounting portion on the electronic apparatus side by sliding a housing thereof on the battery mounting portion. A lock recess is formed in each of side surfaces adjacent to a mount surface for mounting to the battery mounting portion through a pair of side edges parallel to the sliding direction of the mount surface, and a detection recess is formed in one or each of the side surfaces according to the kind of the battery pack; and the lock recess includes an inclined surface portion, and a clamped portion to be clamped between a bottom surface of the battery mounting portion and the lock protrusion, and the thickness of the clamped portion in a height direction is set to be larger than the depth of the detection recess in the same direction.

5 Claims, 22 Drawing Sheets

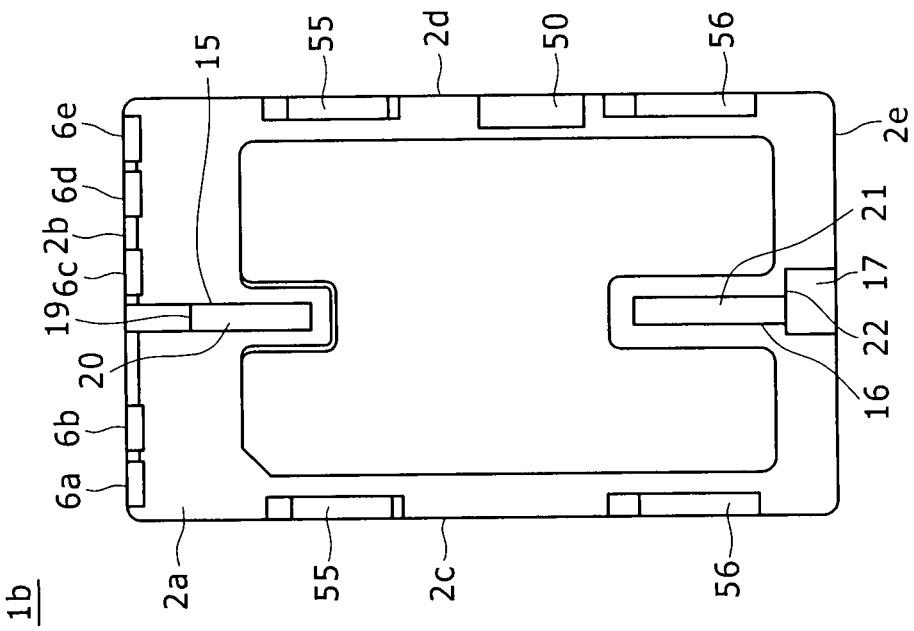
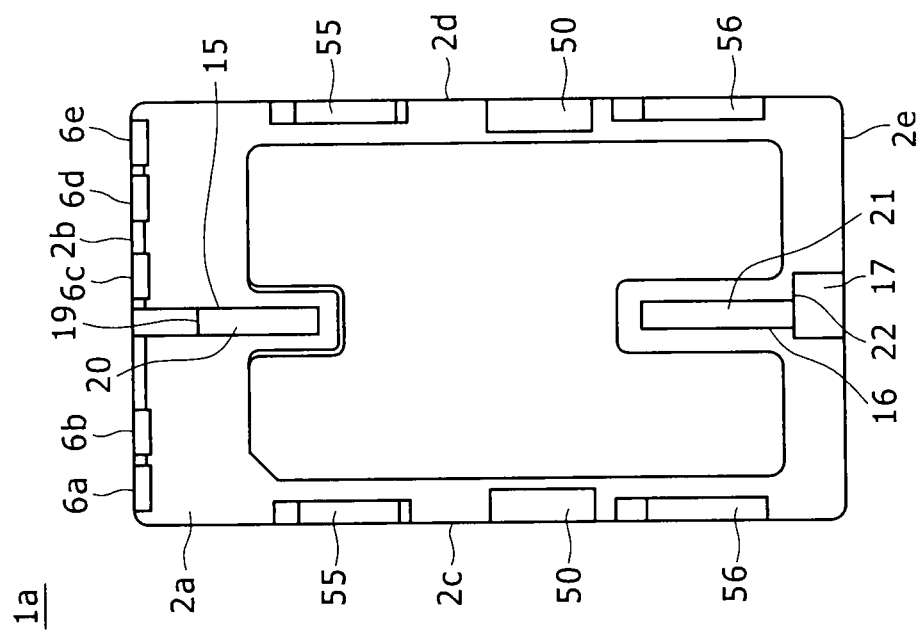

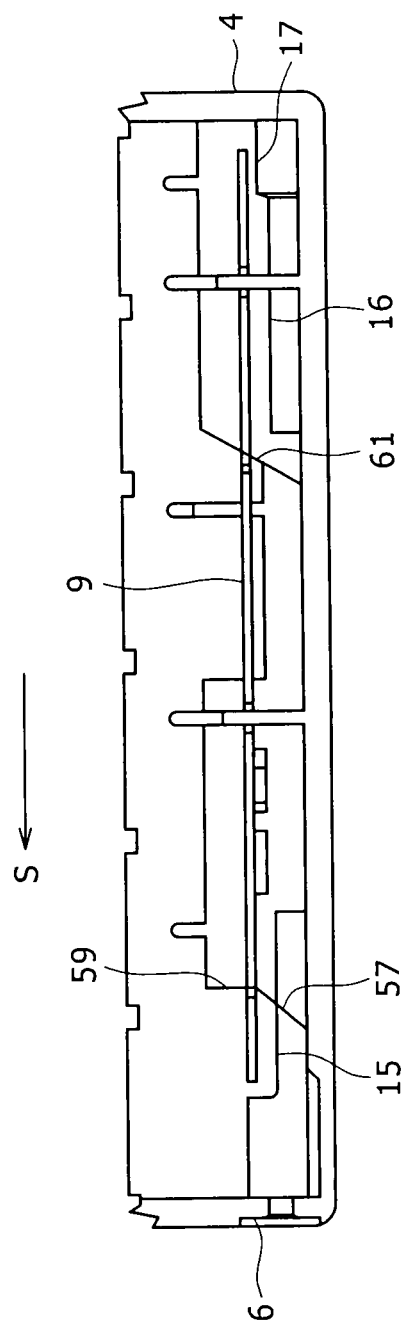

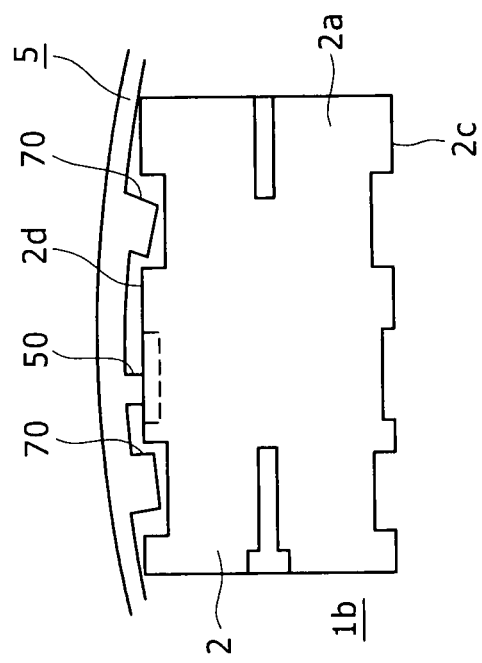
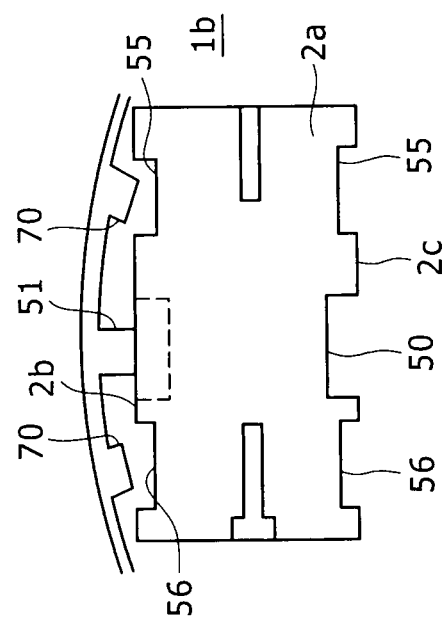

122 RESIDUAL CAPACITY DISPLAY SW → 123 DETECTOR → 124 CONTROL UNIT → 121 DISPLAY WINDOW LED

FIG.24

| ABSOLUTE RESIDUAL CAPACITY RATIO (%) | LED1 (GREEN) | LED2 (GREEN) | LED3 (GREEN) | LED4 (GREEN) |
|---|---|---|---|---|
| 100~80% | ON | ON | ON | ON |
| 79~60% | ON | ON | ON | OFF |
| 59~40% | ON | ON | OFF | OFF |
| 39~20% | ON | OFF | OFF | OFF |
| 19~0% | OFF | OFF | OFF | OFF |

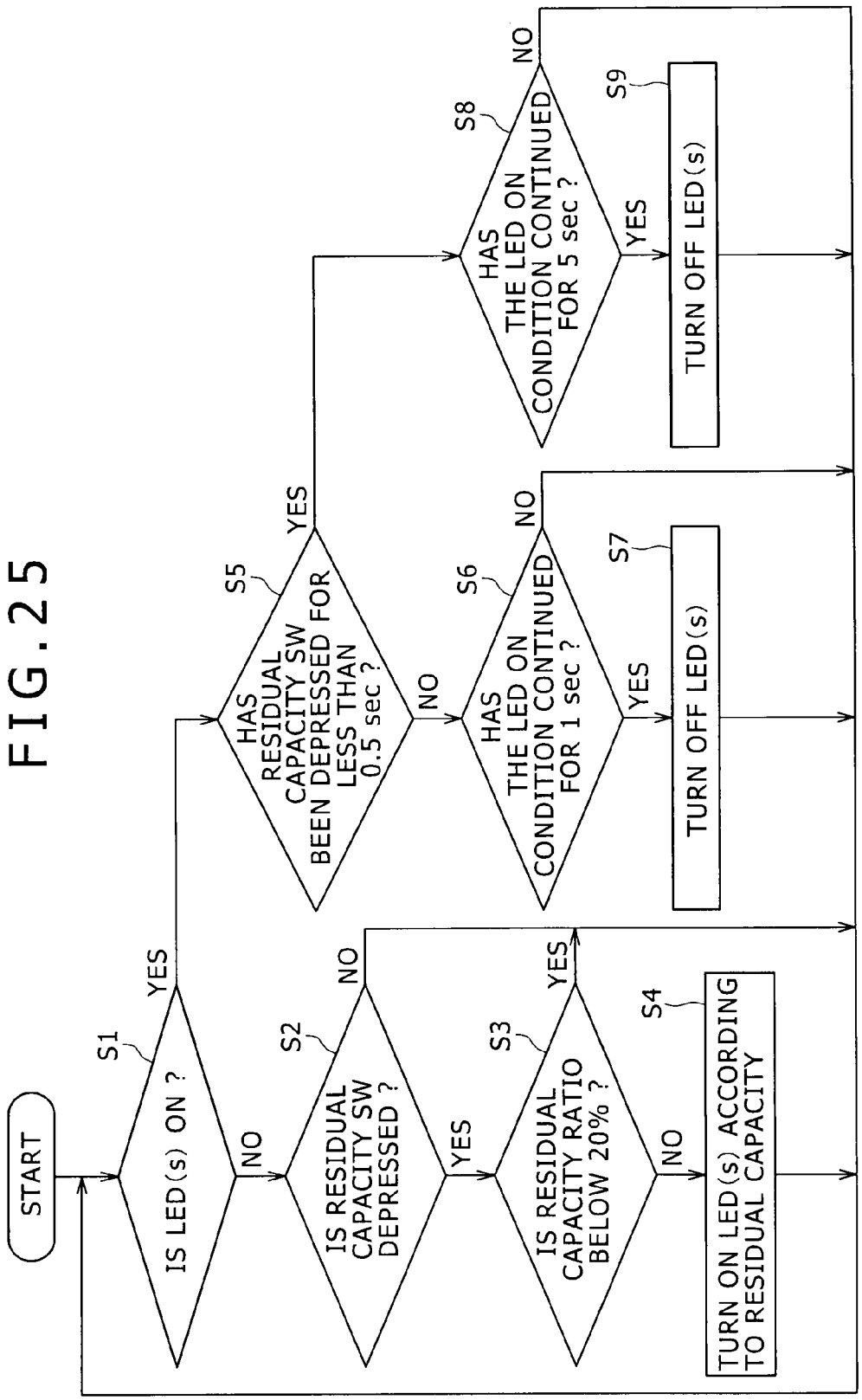

BATTERY PACK

CROSS REFERENCES TO RELATED APPLICATIONS

The present invention contains subject matter related to Japanese Patent Application JP 2007-095329 filed in the Japan Patent Office on Mar. 30, 2007, the entire contents of which being incorporated herein by reference.

BACKGROUND OF THE INVENTION

1. Field of the Invention

The present invention relates to a battery pack which is formed so that it can be attached to and detached from an electronic apparatus and in which battery cells for supplying driving electric power to the apparatus main body is contained.

2. Description of the Related Art

As portable electronic apparatuses such as digital still cameras and camcorders, there have widely been used those which are provided with a battery mounting portion such that a battery pack loaded with battery cells is attached thereto and detached therefrom by the user himself. At the time of using such an apparatus, a previously charged battery pack is attached to the battery mounting portion, and, when the battery has run down, the battery is replaced with a separately charged spare battery pack, whereby the apparatus can be used for a long time.

Each of this kind of battery packs is provided with terminal portions corresponding to electrode terminals disposed on the battery mounting portion side, and is attached to the battery mounting portion in such a manner that the terminal portions are mated to the electrode terminals. Here, in business-use camcorder and the like, the battery capacity required is higher, the battery cells incorporated therein are hence larger and the battery pack is larger in size and weight, since the use time is longer and the use frequency is higher, as compared with private-use camcorders and the like. In the business-use camcorders and the like, therefore, the loads exerted on the engaging members provided between the battery pack and the battery mounting portion to which the battery pack is attached have been increasing, and, when vibration is generated on the apparatus main body side during use, excessive loads would be exerted on the engaging members. Therefore, the engaging members formed in the battery mounting portion and the battery pack need to be enhanced in strength.

In addition, in the case where a plurality of kinds of battery packs different in electric capacity or the like are prepared, if a battery pack is erroneously mounted to an electronic apparatus of a non-compatible model, such troubles as malfunction of the electronic apparatus and early run-down of the battery would be generated. Therefore, there is a need for a mechanism to ensure that each battery pack cannot be mounted to the non-compatible model.

[Patent Document 1]
Japanese Patent Laid-open No. 2006-185822

SUMMARY OF THE INVENTION

Thus, there is a need for a battery pack with which it is possible to secure reliability of connection between the battery pack and a battery mounting portion and to prevent mis-mounting of the battery pack to an electronic apparatus non-compatible therewith, even in the case where the battery pack has an enlarged size and an enlarged weight.

According to an embodiment of the present invention, there is provided a battery pack which is loaded and unloaded to and from a battery mounting portion on the electronic apparatus side by sliding a housing thereof on the battery mounting portion, wherein in the housing, a lock recess for engagement with a lock protrusion formed to protrude from the battery mounting portion side is formed in each of side surfaces adjacent to a mount surface for mounting to the battery mounting portion through a pair of side edges parallel to the sliding direction of the mount surface, and a detection recess for engagement with a protrusion formed to protrude from the battery mounting portion side so as to detect the kind of the battery pack is formed in one or each of the side surfaces according to the kind of the battery pack; and the lock recess includes an inclined surface portion for drawing in the lock protrusion, and a clamped portion to be clamped between a bottom surface of the battery mounting portion and the lock protrusion through sliding of the housing in the battery mounting portion, and the thickness of the clamped portion in a height direction substantially orthogonal to the mount surface is set to be larger than the depth of the detection recess in the same direction.

In the battery pack based on the embodiment of the present invention, the thickness of the clamped portion is set to be larger than the depth of the detection recess. Therefore, when the lock protrusion formed to protrude from the battery mounting portion is erroneously inserted into the detection recess at the time of mounting the mount surface on the battery mounting portion, the housing cannot be inserted to the bottom surface of the battery mounting portion. Accordingly, due to the inclination of the housing or the like abnormality, the user can easily judge that the housing is not appropriately inserted in the battery mounting portion.

BRIEF DESCRIPTION OF THE DRAWINGS

FIGS. 6A and 6B are bottom views each showing the bottom surface of a housing, wherein FIG. 6A shows the large size battery, while FIG. 6B shows the small size battery;

FIG. 7 is a sectional view showing a circuit board disposed inside the housing;

FIGS. 11A and 11B each show a side view of the housing in the case where a battery of a wrong size is erroneously inserted into the battery mounting portion;

FIGS. 17A and 17B show a terminal case connected to the battery cells and the circuit board, wherein FIG. 17A is a front view, and FIG. 17B is a bottom view;

FIGS. 20A and 20B are perspective views of a terminal plate, wherein FIG. 20A shows a one surface side, and FIG. 20B shows the bottom surface side;

FIG. 23 is a block diagram of a residual capacity display portion;

FIG. 24 is a table showing the ON/OFF conditions of the residual capacity display portion; and FIG. 25 is a flow chart showing the flow of display in the residual capacity display portion.

DETAILED DESCRIPTION OF THE PREFERRED EMBODIMENTS

Figure 1A:
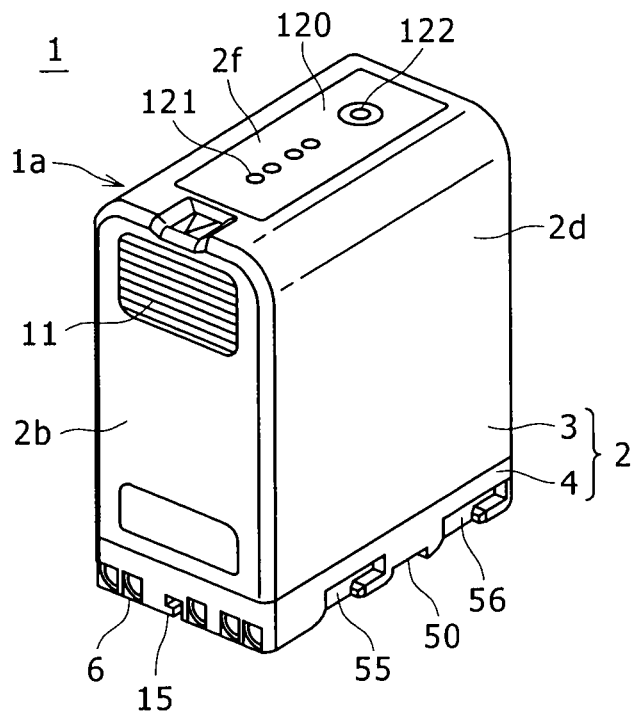
FIGS. 1A and 1B are perspective views of a large size battery.
Figure 1B:
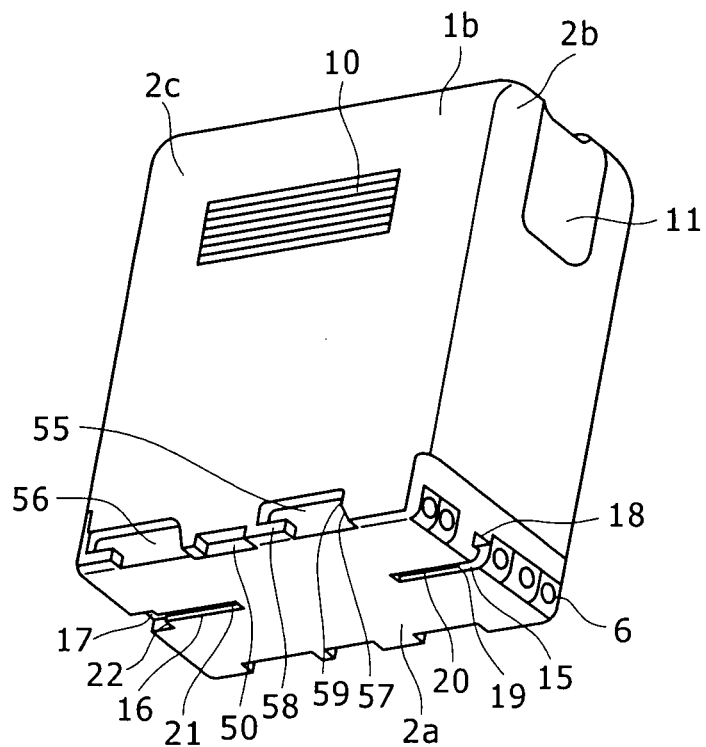
Figure 2:
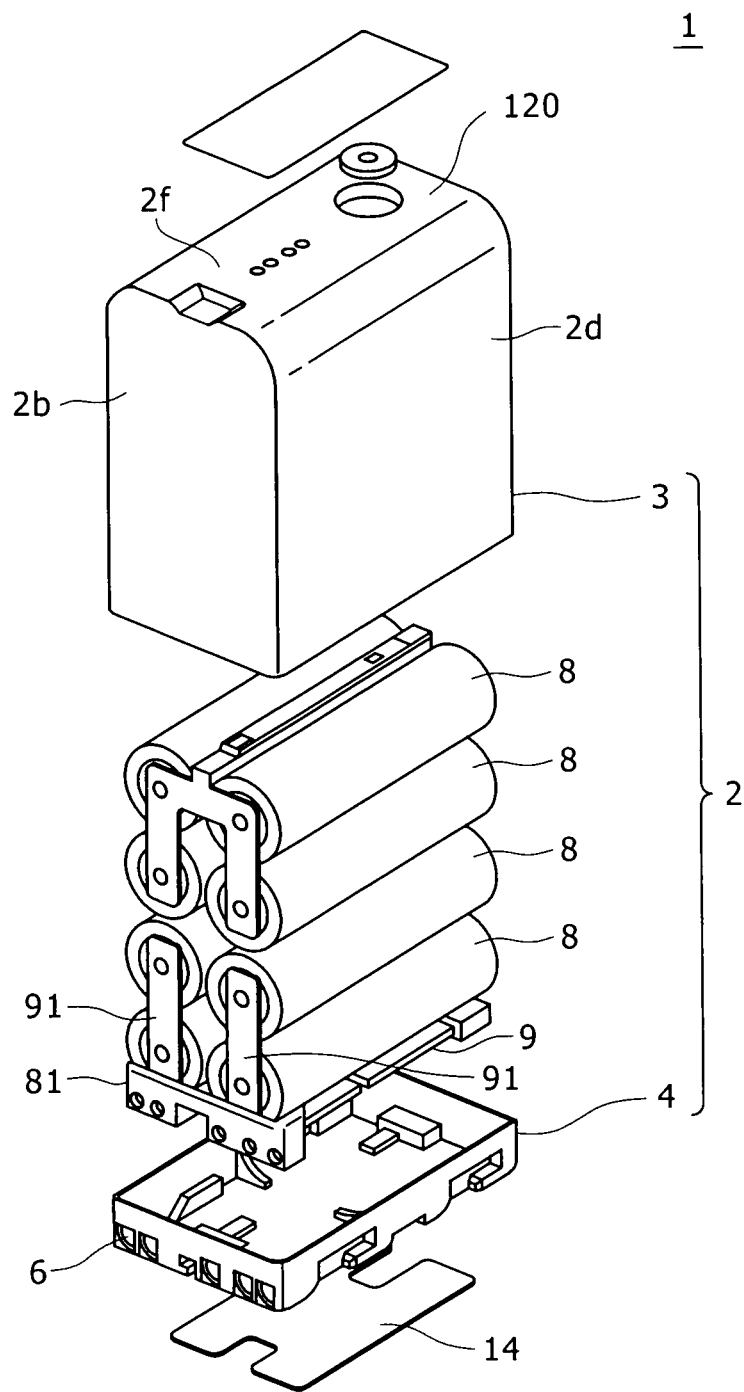
FIG. 2 is an exploded perspective view of the battery.

Now, a battery pack based on embodiments according to the present invention will be described in detail below, referring to the drawings. As shown in FIGS. 1A and 1B, the battery pack 1 has a housing 2 containing battery cells therein and formed in a substantially rectangular shape, with terminal holes in a front surface thereof. As shown in FIG. 2, the housing 2 has an upper cover 3 and a lower case 4 abuttingly coupled to each other, and a plurality of battery cells 8 composed of lithium ion secondary batteries and a circuit board 9 on which a protective circuit, an SMBus (System Management Bus) controller, an ID resistor and the like are mounted and which is provided with an SMBus line are contained in the housing 2. Besides, as shown in FIGS. 1A, 1B, 3A and 3B, the battery packs 1 are prepared in two kinds, namely, for example, large size battery packs 1a and small size battery packs 1b made to be different from each other in electric capacity according to the number of the battery cells 8 to be contained in the housing 2, and the two kinds of the battery packs 1 are used selectively according to the electronic apparatus for which they are used. Specifically, the large size battery pack 1a contains eight battery cells in two rows and four layers, while the small size battery pack 1b contains four battery cells in two rows and two layers.

Of the housing 2 thus containing the battery cells, a lower surface 2a is made to be a mount surface which is mounted on a battery mounting portion 5 on the electronic apparatus side, and first to fifth terminal portions 6a to 6e are disposed fronting on a front surface 2b which is continuous with the mount surface. Terminals formed at the terminal portions 6a to 6e have respectively predetermined functions; more specifically, the first terminal portion 6a is a positive electrode terminal of the battery pack 1, the second terminal portion 6b is a clock line terminal in the SMBus line, the third terminal portion 6c is a data line terminal in the SMBus line, the fourth terminal portion 6d is an ID terminal connected with an ID resistor, and the fifth terminal portion 6e is a negative electrode terminal of the battery pack 1.

In mounting the battery pack 1 in the electronic apparatus, it is inserted into the battery mounting portion 5 on the electronic apparatus side, with the lower surface 2a as an insertion end, and, after the lower surface 2a comes into abutment on a bottom surface 5a of the battery mounting portion 5, the battery pack 1 is slid toward the side of the front surface 2b, whereby lock recesses 55 and 56 provided in both side surfaces 2c and 2d of the housing 2 are locked by lock protrusions 70 formed in the battery mounting portion 5, resulting in that the battery pack 1 is mounted in the electronic apparatus. To detach the battery pack 1 from the electronic apparatus, the battery pack 1 is slid toward the side of a back surface 2e opposite to the front surface 2b of the housing 2, and then the battery pack 1 is pulled up toward the side of an upper surface 2f opposite to the lower surface 2a, whereby the battery pack 1 is detached.

Figure 4:
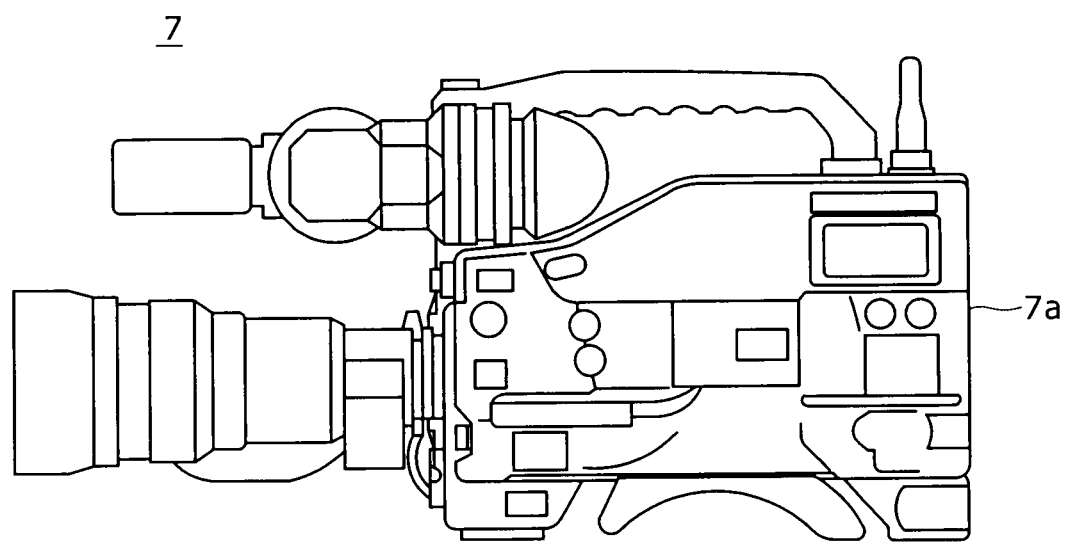
FIG. 4 is a side view of a camcorder in which a battery is to be mounted.

Examples of the electronic apparatus for which the battery pack 1 is used include a camcorder 7 shown in FIG. 4. The camcorder 7 is one for business use, and is provided with the battery mounting portion 5 at a back surface 7a of a main body thereof. The battery mounting portion 5 is so set that only the large size battery pack 1a having a considerable battery capacity can be mounted therein, in view of the use time and frequency of the business-use camcorder 7 and the like factors.

Figure 5:
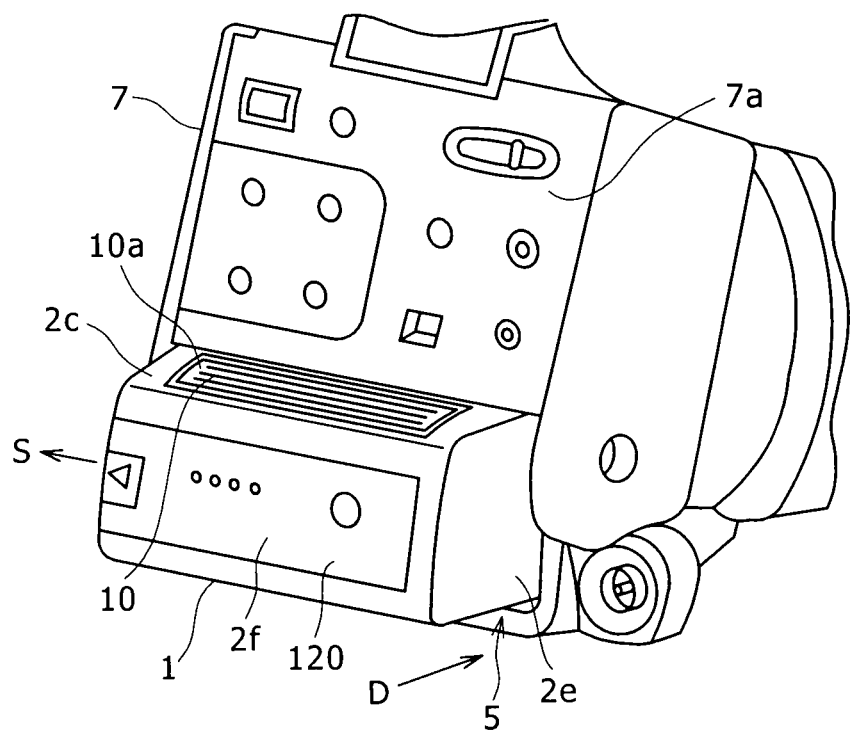
FIG. 5 is a perspective view of the camcorder with the battery mounted therein.

As shown in FIG. 5, the battery pack 1 is inserted into the battery mounting portion 5 of the camcorder 7 in the direction of an arrow D in the figure along the right side of a back surface 7a of the camcorder 7, with its lower surface 2a as an insertion end, until it comes to a loading/unloading position where the lower surface 2a abuts on the bottom surface 5a of the battery mounting portion 5. Next, the battery pack 1 inserted to the loading/unloading position inside the battery mounting portion 5 is slid in the direction of an arrow S, namely, leftwards in FIG. 5, until it comes to a mounting position where terminal pins 101 fronting on the inside of the battery mounting portion 5 are inserted in the terminal portions 6 provided at the front surface 2b of the battery pack 1 and, simultaneously, the lock recesses 55 and 56 provided in both side surfaces 2c and 2d of the battery pack 1 are locked by the lock protrusions 70, whereby the mounting is completed.

Incidentally, the battery cells 8 are contained in two rows in the battery pack 1, irrespectively of whether the battery pack 1 is the large size battery pack 1a or the small size battery pack 1b; therefore, the area of the lower surface 2a serving as a mount surface for mounting into the battery mounting portion 5 is set substantially the area occupied by two battery cells 8 disposed side by side. Accordingly, even in the camcorder 7 for which the large size battery pack 1a is used, the area of the battery mounting portion 5 need not be so large, and other switches can be arranged at the back surface 7a of the main body of the camcorder 7.

Figure 3A:
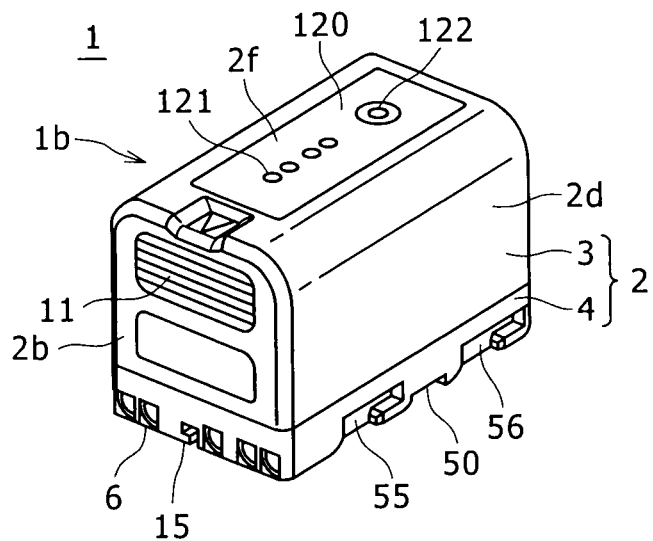
FIGS. 3A and 3B are perspective views of a small size battery.
Figure 3B:
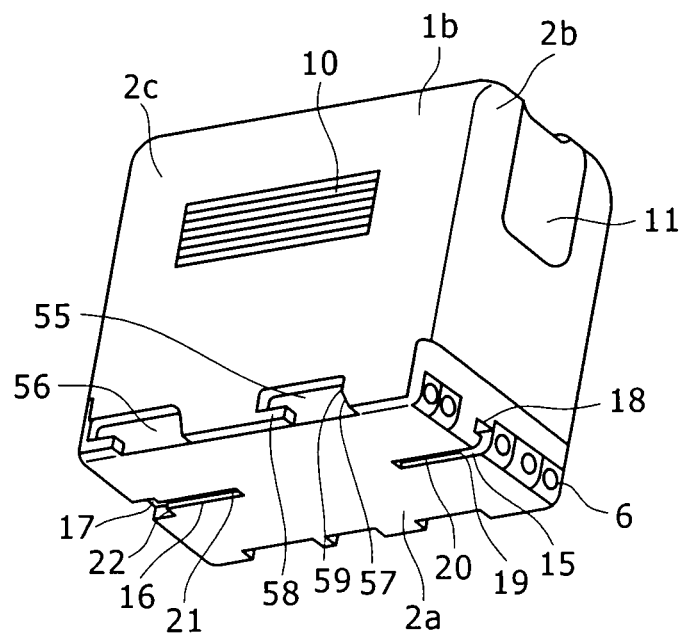

Now, the configuration of the battery pack 1 will be specifically described below. The housing 2 of the battery pack 1 is formed from a synthetic resin. As shown in FIGS. 1B and 3B, one side surface of the battery pack 1 which is adjacent to the front surface 2b and the back surface 2e and which is directed vertically upwards at the time of mounting the battery pack 1 into the battery mounting portion 5 is provided with an identification portion 10 for identifying gripping surfaces according to the mounting direction. In addition, the front surface 2b and the back surface 2e of the housing 2 are provided with anti-slip portions 11 at positions to be gripped by the user. With the identification portion 10 and the anti-slip portion 11 thus formed, it can be seen if the housing 2 is gripped correctly in mounting the battery pack 1 into the battery mounting portion 5. Besides, the housing 2 can be gripped assuredly even where the housing 2 has an increased weight.

Specifically, at the time of mounting the battery pack 1 into the battery mounting portion 5, the battery pack 1 is inserted in such a manner that its lower surface 2a serving as the mount surface is used as the insertion end, and the front surface 2b provided with the terminal portions 6 is slid in a horizontal direction, as above-mentioned. Therefore, it would be necessary for the user to grip the battery pack 1 in the condition where the front surface 2b is directed toward the terminal side in the battery mounting portion 5.

The identification portion 10 is for permitting the user to discriminate the gripping surfaces of the housing 2 at the time of mounting the battery pack 1 into the battery mounting portion 5. The identification portion 10 is formed by a method in which one side surface 2c is provided with a recessed surface portion 10a, the inside of the recessed surface portion 10a is grained, and, further, the recessed surface portion 10a is provided with grains composed of protrusions extending in the front-rear direction. When the user grips the battery pack 1 with his right hand, the index finger or the middle finger is put on the one side surface 2c so that the identification portion 10 makes contact with the fingertip; as a result, it can be intuitively perceived that the housing 2 is correctly gripped with its one side surface 2c directed vertically upwards, and the sliding direction upon insertion of the housing 2 into the battery mounting portion 5 can also be grasped intuitively.

In addition, as above-mentioned, where the battery pack 1 is the large size battery pack 1a, a total of eight battery cells 8 are contained in two rows and four layers, and where the battery pack 1 is the small size battery pack 1b, a total of four battery cells 8 are contained in two rows and two layers. As a result, the large size battery pack 1a is about 550 g in weight, while the small size battery pack 1b is 300 g in weight, heavier than a private-use battery in which battery cells are contained in two rows and one layer. Accordingly, the battery packs should be prevented from slipping down from the user's hand.

The anti-slip portions 11 formed in the front surface 2b and the back surface 2e are for preventing the slipping-down of the battery pack 1 by making the housing 2 easier to grip by the user's hand at the time of mounting the battery pack 1 into the battery mounting portion 5. The anti-slip portions 11 are formed by forming recessed surface portions 11a at upper portions of the front surface 2b and the back surface 2e, and graining the inside of the recessed surface portions 11a. When gripping the battery pack 1 with the right hand, the user put the thumb on the anti-slip portion 11 in the front surface 2b, and put the middle finger or the third finger and the little finger on the anti-slip portion 11 in the back surface 2e, whereby the rugged surfaces of the anti-slip portions 11 function to give frictional resistance, ensuring that the housing 2 can be held securely without slipping. Incidentally, as the shape of the grains imparted to the recessed surface portions 11a of the anti-slip portions 11, any of a variety of shapes can be adopted.

Incidentally, the housing 2 is provided with a grain different from those of the identification portion 10 and the anti-slip portions 11, in other regions than the identification portion 10 and the anti-slip portions 11 of the upper cover 3.

Now, the configuration of the lower surface 2a serving as the mount surface for mounting into the battery mounting portion 5 will be described below. The lower surface 2a is provided with a pair of insertion guide grooves 15 and 16 which extend along and are spaced from each other along the direction of sliding between the mounting position and the lading/unloading position inside the battery mounting portion 5, and other region than the insertion guide grooves 15 and 16 is used as a region for adhering an identification label 14 (see FIG. 2). Into the insertion guide grooves 15 and 16, guide protrusions 30 and 31 projectingly provided on the bottom surface 5a of the battery mounting portion 5 are inserted, whereby the operations of mounting and dismounting the housing 2 are guided, and the housing 2 mounted in the battery mounting portion 5 is prevented from chattering in the direction of both side surfaces 2c and 2d.

As shown in FIGS. 6A and 6B, the housing 2 has the lower surface 2a provided with the insertion guide grooves 15 and 16 spaced from each other along the sliding direction, whereby a substantially central portion can be made to be wide, and a side adhering region for the identification label 14 can be secured. In addition, since the lower surface of the housing 2 is not cut up into left and right portions by the insertion guide grooves 15 and 16, as shown in FIG. 2, a large single identification label 14 formed in a substantially H shape can be adhered.

Furthermore, since the housing 2 has the lower surface 2a provided with the insertion guide grooves 15 and 16 spaced from each other along the sliding direction, as shown in FIG. 7, that region of the inside surface of the lower surface 2a which is occupied by protrusions present due to the insertion guide grooves 15 and 16 projecting to the inside of the housing 2 can be minimized. Therefore, in the housing 2, a wide electronic part mounting region and a wide patterning region can be secured on the lower surface 2a side of the circuit board 9 disposed on the inside of the lower surface 2a, and efficient use of space can be realized.

The insertion guide grooves 15 and 16 are formed substantially in the center in the width direction of the lower surface 2a along the front-rear direction. In addition, the front surface side insertion guide groove 15 formed on the front surface 2b side has an end face fronting on a lower portion of the front surface 2b, while the back surface side insertion guide groove 16 formed on the back surface 2e side has an end face fronting on a lower portion of the back surface 2e and is provided with a lock recess 17 by which a lock piece 35 provided in the battery mounting portion 5 is locked.

Figure 8:
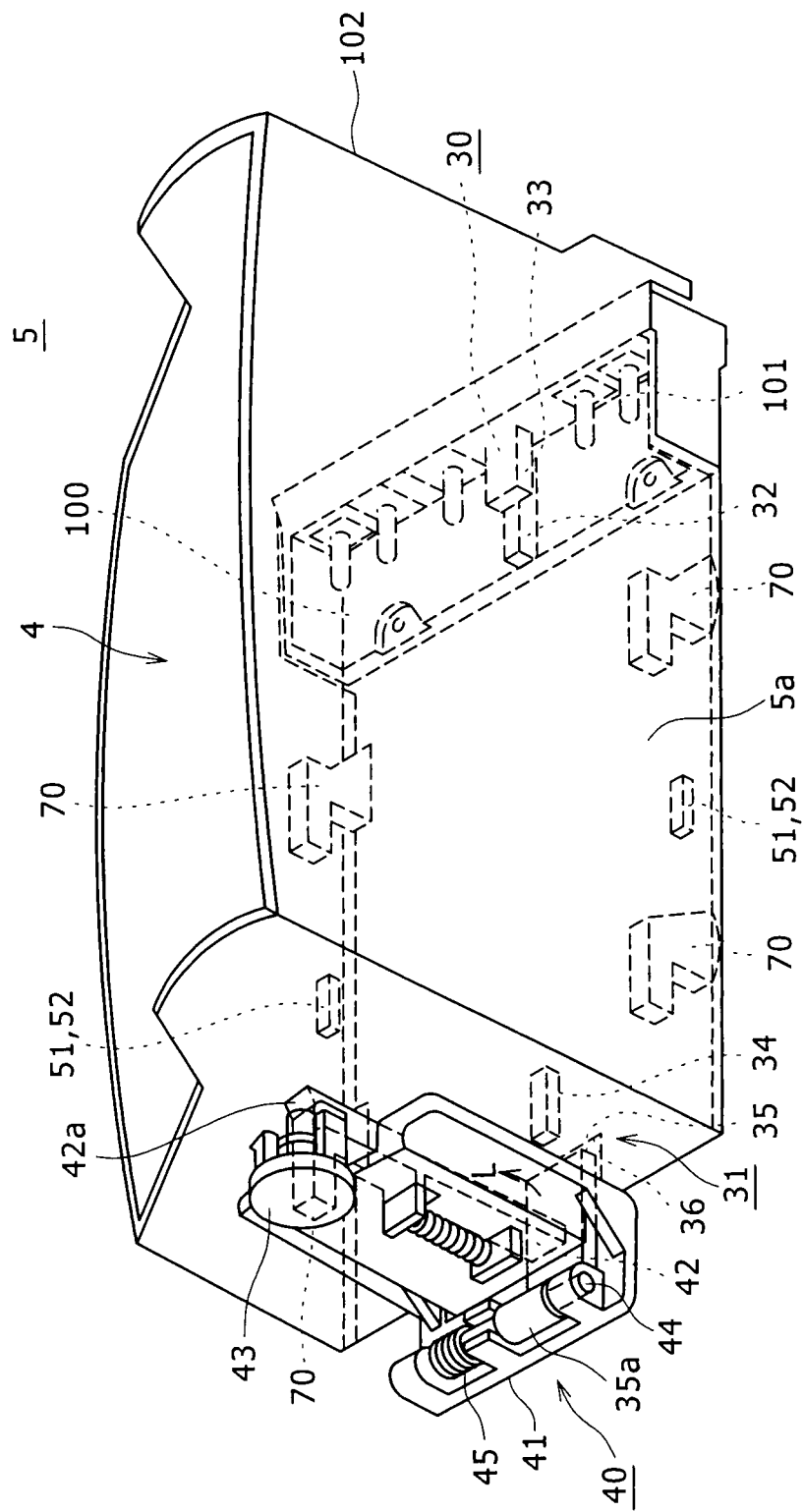
FIG. 8 is a perspective view showing a battery mounting portion.

The front surface side insertion guide groove 15 is provided with an L-shaped opening 18 where its insertion end fronting on the front surface 2b is opened in a substantially L shape, and a front surface side guide groove portion 20 continued through a stepped portion 19 formed on the back surface side relative to the L-shaped opening 18. As shown in FIG. 8, a front surface side guide protrusion 30 formed at the deepest portion in the sliding direction of the battery mounting portion 5 is passed through the front surface side insertion guide groove 15. The front surface side guide protrusion 30 is provided with a front surface side protruding bar 32 to be inserted in the front surface side guide groove portion 20, and a lock protrusion 33 substantially L-shaped in section which is formed on the deeper side of the front surface side protruding bar 32 and which is locked by the L-shaped opening 18. The front surface side insertion guide groove 15 is so formed that when the housing 2 is inserted to the loading/unloading position in the battery mounting portion 5 and is slid toward the front surface 2b side to the mounting position, the front surface side protruding bar 32 of the front surface side guide protrusion 30 is inserted in the front surface side guide groove portion 20, an end face of the lock protrusion 33 abuts on the stepped portion 19, and the lock protrusion 33 is locked by the L-shaped opening 18.

The back surface side insertion guide groove 16 is provided with the lock recess 17 for locking the lock piece 35, by forming an end portion fronting on the back surface 2e in a substantially rectangular shape, and with a back surface side guide groove portion 21 formed on the front surface side relative to the lock recess 17. The back surface side guide groove portion 21 is formed in line with the front surface side guide groove portion 20. In addition, the lock recess 17 is formed to be wider than the back surface side guide groove portion 21, and is formed to be continuous with the back surface side guide groove portion 21, whereby a lock wall 22 for locking the lock piece 35 is provided on the front surface side of the housing 2.

Into the back surface side insertion guide groove 16, a back surface side guide protrusion 31 formed in the battery mounting portion 5 is inserted. The back surface side guide protrusion 31 is provided with a back surface side protruding bar 34 to be passed through the back surface side guide groove portion 21, and the lock piece 35 to be locked by the lock recess 17. The back surface side protruding bar 34 is formed in line with the front surface side protruding bar 32. Besides, the lock piece 35 is inserted in the battery mounting portion 5 through a lock hole 36 opened in the bottom surface 5a of the battery mounting portion 5, as shown in FIG. 8, whereby its tip portion is brought into abutment on the lock wall 22. The lock piece 35 can be turned into and out of the battery mounting portion 5 by a turning mechanism 40.

The turning mechanism 40 is mounted to a back surface wall of the battery mounting portion 5, and includes a support plate 41 for supporting the lock piece 35, a push bar 42 for pushing the lock piece 35, and an operating button 43 for operating the push bar 42. The support plate 41 supports a turning shaft 44 passed through a turning bearing 35a formed at a rear end portion of the lock piece 35. In addition, the turning shaft 44 is fitted with a coil spring 45 of which one end is locked on the support plate 41 and the other end is locked on the lock piece 35. This ensures that the lock piece 35 is constantly turningly urged by the coil spring 45 in the direction of an arrow L in FIG. 8 so that its tip portion is made to front on the inside of the battery mounting portion 5 through the lock hole 36. The push bar 42 for pushing the lock piece 35 is for turning the lock piece 35, which is urged toward the direction of the arrow L, in the direction opposite to the arrow L, and is supported by the support plate 41 so as to be movable up and down between the support plate 41 and a side surface of the battery mounting portion 5. The push bar 42 abutting on the lock piece 35 at its one end is provided with an inclined surface portion 42a at its other end opposite to the one end, and the operating button 43 abuts on the inclined surface portion 42a. The operating button 43 is for turning the lock piece 35 in the direction opposite to the arrow L by sliding the push bar 42 through pushing the inclined surface portion 42a of the push bar 42. The operating button 43 is supported on a side surface of the battery mounting portion 5 by a support member (not shown), and is constantly urged by the coil spring 45 in such a direction that its tip portion is spaced away from the inclined surface portion 42a of the push bar 42.

The back surface side insertion guide groove 16 is so configured that, when the housing 2 is inserted into the battery mounting portion 5 and is slid toward the front surface 2b side, the back surface side protruding bar 34 is inserted in the back surface side guide groove portion 21, and the lock piece 35 is inserted in the lock recess 17 so as to abut on the lock wall 22 formed between the lock recess 17 and the front surface side guide groove portion 20.

As a result, the housing 2 is guided in the sliding inside the battery mounting portion 5, and is prevented from chattering in a direction orthogonal to the sliding direction. More specifically, with the front surface side guide protrusion 30 inserted in the front surface side insertion guide groove 15 and with the back surface side guide protrusion 31 inserted in the back surface side insertion guide groove 16, the housing 2 is prevented from chattering in the direction of both side surfaces 2c and 2d.

In addition, with the lock protrusion 33 engaged with the L-shaped opening 18, the housing 2 is prevented from chattering in the direction of both side surfaces 2c and 2d and from chattering in the direction of the upper and lower surfaces 2f and 2a. Therefore, the housing 2 can be secured in reliability of connection to the battery mounting portion 5. Besides, with the L-shaped opening 18 is made to be exposed side by side with the terminal portions 6a to 6e, stresses pertaining to the terminal portions 6a to 6e can be suppressed, and reliability of electrical connection can be secured.

Furthermore, when the housing 2 is slid to the mounting position, the lock piece 35 abuts on the lock wall 22, whereby the housing 2 is prevented from sliding in the direction of the back surface 2e, namely, in the direction from the mounting position toward the loading/unloading position, and is prevented from slipping off the battery mounting portion 5 due to vibration, shock or the like. In addition, the housing 2 is prevented from chattering in the battery mounting portion 5, also by the locking of the lock piece 35 in the lock recess 17.

Incidentally, in detaching (unloading) the battery pack 1 from the battery mounting portion 5, the operating button 43 of the turning mechanism 40 is depressed, upon which the tip of the operating button 43 pushes the inclined surface portion 42a of the push bar 42, and the push bar 42 is slid toward the bottom surface 5a side. As a result, the lock piece 35 pushed by the push bar 42 so as to be urged turningly in the direction opposite to the arrow L, so that the lock piece 35 is retracted from the inside of the battery mounting portion 5, and is disengaged from the lock recess 17 of the housing 2. This results in that the housing 2 can be slid in the direction of the back surface 2e.

Thus, the back surface side insertion guide groove 16 is provided with the lock recess 17 continuous with the back surface side guide groove portion 21, whereby it is promised that the housing 2 is prevented from chattering in the battery mounting portion 5 and from sliding in the direction of the back surface 2e. In addition, that region of the lower surface 2a which is occupied by the back surface side insertion guide groove 16 can be reduced, and efficient utilization of the lower surface 2a can be contrived. Therefore, the housing 2 is provided with a wider region for adhering the identification label 14 onto the lower surface 2a, and with an enlarged region for disposing the circuit board 9 on the inside of the lower surface 2a.

Now, the configuration of both side surfaces 2c and 2d of the housing 2 will be described below. The housing 2 is provided with a detection recess or recesses 50 for detecting the kind of the battery pack 1, at an edge or edges formed between the lower surface 2a and one or both of the side surfaces 2c and 2d. As above-mentioned, the battery packs 1 prepared are classified into the large size battery packs 1a and the small size battery packs 1b, according to the magnitude of battery capacity. In the large size battery pack 1a, the detection recesses 50 are provided respectively in both side surfaces 2c and 2d, as shown in FIG. 6A; in the small size battery pack 1b, on the other hand, the detection recess 50 is provided only on the side of the other side surface 2d, as shown in FIG. 6B.

Figure 9:
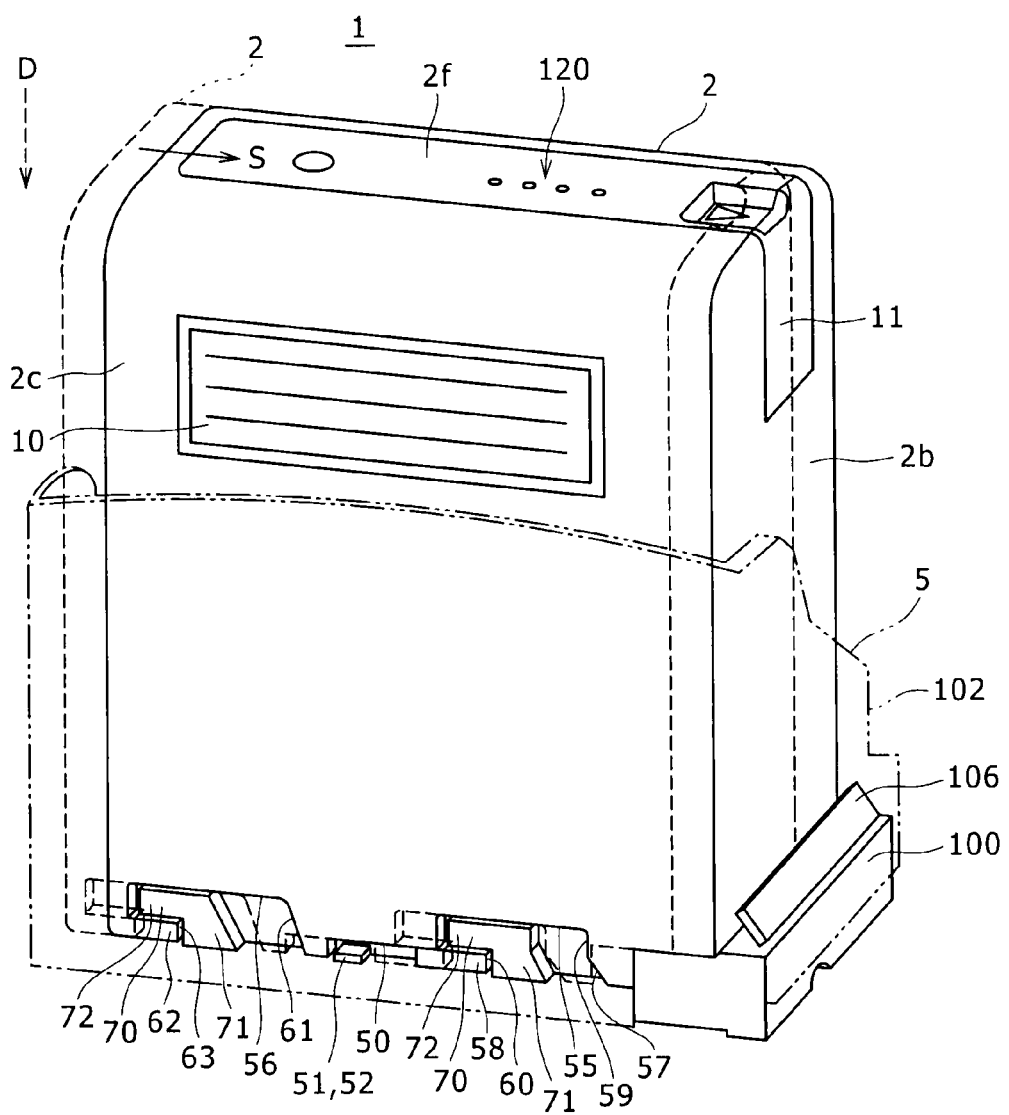
FIG. 9 is a perspective view showing a battery to be attached to the battery mounting portion.

In addition, as shown in FIG. 9, the battery mounting portion 5 is provided with mis-insertion preventive engaging protrusions 51 corresponding to the detection recess 50, on side surfaces opposed to the side surfaces 2c and 2d. With such engaging protrusions 51 projectingly provided, mis-mounting of a battery pack of a non-compatible size can be obviated. Specifically, since the large size battery pack 1a is provided with a pair of the detection recesses 50 in both side surfaces 2c and 2d, the battery mounting portion 5 of an electronic apparatus corresponding to the large size battery pack 1a is provided with a pair of the engaging protrusions 51 for engagement with both detection recesses, whereby the small size battery pack 1b provided with the detection recess 50 only in the other side surface 2d can be prevented from being erroneously mounted into the battery mounting portion 5 in consideration. In this case, the engaging protrusion 51 projectingly provided on the side surface opposite to the other side surface 2d of the small size battery pack 1b interferes with the edge formed between the other side surface 2d and the lower surface 2a of the housing 2, whereby the small size battery pack 1b is prevented from being mounted into the battery mounting portion 5. As a result, in the case of a camcorder 7 for business use, for example, the power consumption is large and, therefore, only the large size battery pack 1a having a great battery capacity can be mounted.

Other configurations than the above may also be considered. For example, the L side battery packs 1a may be business-use batteries with comparatively large size and capacity, while the small size battery packs 1b may be private-use batteries with comparatively small size and capacity. In this case, a system may be adopted in which only the large size battery packs 1a can be mounted in the electronic apparatuses for business use, while both size battery packs 1a and 1b can be mounted in electronic apparatuses for private use.

In addition, the housing 2 is provided with the detection recess(es) 50 not in the front surface 2b where a type discriminating rugged pattern has generally been provided, but at the edge(s) formed between the lower surface 2a and one or both of the side surfaces 2c and 2d. This ensures that the housing 2 can be securely provided in its front surface 2b with a space where five terminal portions 6 and an end face of the front surface side insertion guide groove 15 are frontingly provided side by side.

Incidentally, the battery mounting portion 5 may have a configuration in which type discriminating switches 52 corresponding to the detection recesses 50 are projectingly provided on side surfaces opposed to both side surfaces 2c and 2d of the housing 2, in place of the engaging protrusions 51. In this case, when the battery pack 1 is mounted in the battery mounting portion 5, none of the switches 52 is pushed in the case of the large size battery pack 1a, whereas the switch 52 on the side surface opposed to the one side surface 2c of the housing 2 is pushed in the case of the small size battery pack 1b. By detecting the pushed states of the switches 52, it can be discriminated on the electronic apparatus size which of the large size battery pack 1a and the small size battery pack 1b has been mounted.

As a result, a treatment in which an alarm is issued to the user on the electronic apparatus side, a treatment in which supply of electric power from the small size battery pack 1b is not accepted and no operation is conducted, or the like treatment can be carried out in the case where the small size battery pack 1b is mounted.

Now, lock recesses 55 and 56 formed on both sides of the detection recess 50 in the housing 2 and operative to lock the housing 2 in the battery mounting portion 5 will be described below. The lock recesses 55 and 56 are formed on both sides of the detection recess 50 at each of the edges formed between the lower surface 2a and the side surfaces 2c and 2d. The lock recesses 55 and 56 ensure that when the housing 2 is inserted into the battery mounting portion 5 and is slid to the mounting position, lock protrusions 70 projectingly provided on side surfaces of the battery mounting portion 5 correspondingly to the lock recesses 55 and 56 are locked.

As shown in FIG. 9, the front surface side lock recess 55 provided on the side of the front surface 2b of the housing 2 includes an inclined surface portion 57 for drawing in the lock protrusion 70, a clamped portion 58 to be clamped between the lock protrusion 70 and the bottom surface 5a of the battery mounting portion 5, and an orthogonal surface portion 59 continuous with the inclined surface portion 57 and extended in the height direction substantially orthogonal to the lower surface 2a. The front surface side lock recess 55 is provided with an opening 60 through which the lock protrusion 70 is put into and out of a clamped state between the inclined surface portion 57 and the clamped portion 58.

Further, the back surface side lock recess 56 provided on the side of the back surface 2e of the housing 2 includes an inclined surface portion 61 for drawing in the lock protrusion 70, a clamped portion 62 to be clamped between the lock protrusion 70 and the bottom surface 5a of the battery mounting portion 5. The back surface side lock recess 56 is provided with an opening 63 through which the lock protrusion 70 is put into and out of a clamped state between the inclined surface portion 61 and the clamped portion 62.

Each of the lock protrusions 70 to be locked at the front surface side lock recess 55 and the back surface side lock recess 56 includes a base portion 71 provided erectingly from the bottom surface 5a of the battery mounting portion 5, and a lock portion 72 extended from the base portion 71 toward the back surface side of the battery mounting portion 5 and located at upper surfaces of the clamped portions 58 and 62. The lock portion 72 is so configured that its distance from the bottom surface 5a of the battery mounting portion 5 is roughly equal to or slightly smaller than the thickness of the clamped portions 58 and 62 of the housing 2 of which the lower surface 2a is mounted on the bottom surface 5a of the battery mounting portion 5. When the housing 2 is slid to the battery mounting position, the clamped portions 58 and 62 are each pressed into the gap between the lock portion 72 and the bottom surface 5a of the battery mounting portion 5, so as to hold the clamped portions 58 and 62, thereby locking the housing 2 in the battery mounting portion 5.

When the housing 2 is inserted in the direction of an arrow D in FIG. 9 until it comes to the loading/unloading position where its lower surface 2a as the mount surface abuts on the bottom surface 5a of the battery mounting portion 5, the lock portions 72 of the lock protrusions 70 go forward through the openings 60 and 63. In this case, the inclined surface portions 57 and 61 and the orthogonal surface portion 59 of the housing 2 slide on the lock protrusions 70, whereby the lock portions 72 are made to be at the same height as the upper surfaces of the clamped portions 58 and 62 and are guided to such positions as to permit mutual locking. Incidentally, the detection recess 50 is also made to go forward toward the engaging protrusion 51 projectingly provided on the side wall of the battery mounting portion 5. Next, the housing 2 is slid in the direction of an arrow S in FIG. 9, namely, toward the side of the front surface 2b. As a result, terminal pins 101 on the side of the battery mounting portion 5 are inserted into and engaged with the terminal portions 6 made to front on the front surface 2b, and the clamped portions 58 and 62 of the lock recesses 55 and 56 come to be clamped between the lock portions 72 of the lock protrusions 70 and the bottom surface 5a of the battery mounting portion 5.

Incidentally, it suffices for the lock portions 72 to be capable of clamping the clamped portions 58 and 62 between themselves and the bottom surface 5a of the battery mounting portion 5, and they may not necessarily be clamped between the upper surfaces of the clamped portions 58 and 62 and the ceiling surfaces of the lock recesses 55 and 56 opposed to the upper surfaces. Therefore, a configuration may be adopted in which the lock portions 72 do not have a thickness and that gaps are left between the lock portions 72 and the ceiling surfaces of the lock recesses 55 and 56. It is to be noted here that, naturally, the lock portions 72 may be clamped between the upper surfaces of the clamped portions 58 and 62 and the ceiling surfaces of the lock recesses 55 and 56.

At the time of detaching (unloading) the housing 2 from the battery mounting portion 5, the housing 2 is slid in the direction opposite to the arrow S in FIG. 9 from the mounting position to the loading/unloading position, whereby the clamped portions 58 and 62 are drawn out of the gaps between the lock portions 72 and the bottom surface 5a of the battery mounting portion 5. In this instance, the lock portions 72 of the lock protrusions 70 are located in the openings 60 and 63 of the lock recesses 55 and 56, so that the housing 2 can be moved in the direction opposite to the arrow D, namely, in the direction toward the side of the upper surface 2f.

Here, the front surface side lock recess 55 is provided with the orthogonal surface portion 59 continuous with the inclined surface portion 57 and orthogonal to the lower surface 2a. Near the orthogonal surface portion 59, the circuit board 9 is disposed on the inside of the housing 2. In the housing 2, the circuit board 9 is disposed at a height where the inclined surface portion 57 and the orthogonal surface portion 59 meet each other. Specifically, since the housing 2 is provided with the orthogonal surface portion 59 extending in the height direction orthogonal to the lower surface 2a, the circuit board 9 can be held on the inside of the orthogonal surface portion 59 at the height of the meeting point between the inclined surface portion 57 and the orthogonal surface portion 59, whereby the circuit board 9 can be disposed at the height at which the front surface side lock recess 55 is formed.

In the large size battery pack 1a enlarged in size and weight correspondingly to the business-use camcorder 7, in order to secure reliability of connection between the lock recesses 55 and 56 of the housing 2 and the lock protrusions 70 on the side of the battery mounting portion 5, it would be necessary to make the clamped portions 58 and 62 thicker as compared with the related art and to form the lock portions 72 of the lock protrusions 70 to be larger as compared with the related art. Attendant on the increase in the thickness of the clamped portions 58 and 62 and enlargement of the lock portions 72, the lock recesses 55 and 56 are also enlarged in size in the height direction of the housing 2. Since the lock recesses 55 and 56 are projected to the inside of the housing 2 in the same shape, an attempt to ensure that the circuit board 9 disposed on the lower surface 2a side is arranged while avoiding the projected shape results in that the lock recesses 55 and 56 are naturally disposed on the upper side.

However, when it is attempted to set the circuit board 9 more on the upper side of the lower surface 2a, the region for arranging the battery cells 8 connected to the circuit board 9 are also disposed more on the upper side, which leads to an increase in the size of the housing 2 and, on the other hand, generates a dead space between the circuit board 9 and the lower surface 2a. In connection with this, when the housing 2 has a configuration in which an increase in the size of the lock recesses 55 and 56 is contrived and the orthogonal surface portion 59 is provided to thereby arrange the circuit board 9 on the inside of the orthogonal surface portion 59, the height at which to dispose the circuit board 9 can be set closer to the lower surface 2a, and the housing 2 can be prevented from becoming larger in size. In addition, with the orthogonal surface portion 59 formed in continuity with the inclined surface portion 57, the circuit board 9 can be held at the height of the meeting point between the inclined surface portion 57 and the orthogonal surface portion 59, and an increase in the size of the lock recesses 55 and 56 can be attained while maintaining the area and the arranging position of the circuit board 9. Incidentally, the orthogonal surface portion may be formed not only in the front surface side lock recess 55 but also in the back surface side lock recess 56.

Besides, the lock recesses 55 and 56 have the clamped portions 58 and 62 formed to have a thickness larger than the depth of the detection recess 50 in the height direction orthogonal to the lower surface 2a. This can prevent the lock protrusion 70 from being erroneously inserted into the detection recess 50 in putting the housing 2 in position.

Figure 10A:
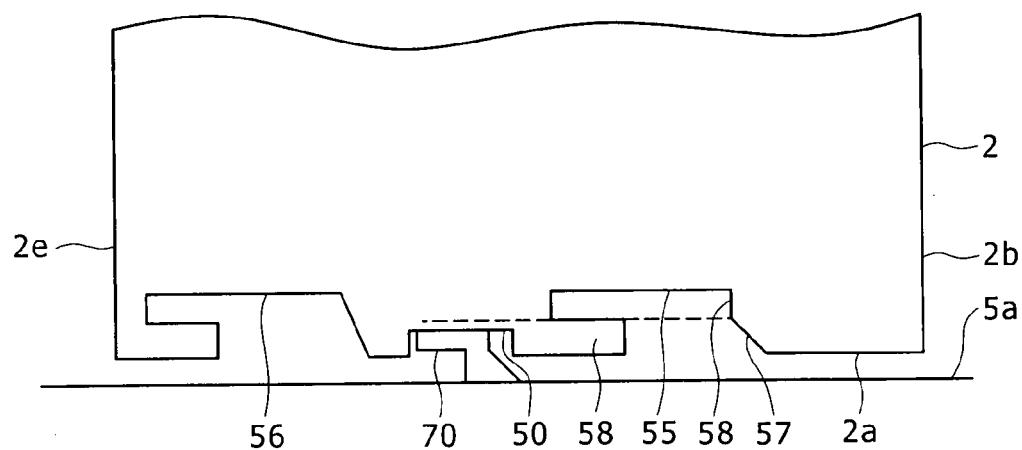
FIGS. 10A and 10B are side views showing a detection recess and a lock recess, respectively.

More specifically, in the case where the lower surface 2a is mounted on the bottom surface 5a without the housing 2 being guided by a side wall of the battery mounting portion 5 or the like case, the lock protrusion 70 might be erroneously inserted into the detection recess 50. In this case, as shown in FIG. 10A, a configuration in which the depth of the detection recess 50 is smaller than the thickness of the clamped portions 58 and 62 ensures that the housing 2 cannot be inserted to the loading/unloading position where its lower surface 2a abuts on the bottom surface 5a of the battery mounting portion 5 and that an inclination of the housing 2 or the like abnormality is found, which permits the user to recognize that appropriate insertion has not been made.

Figure 10B:
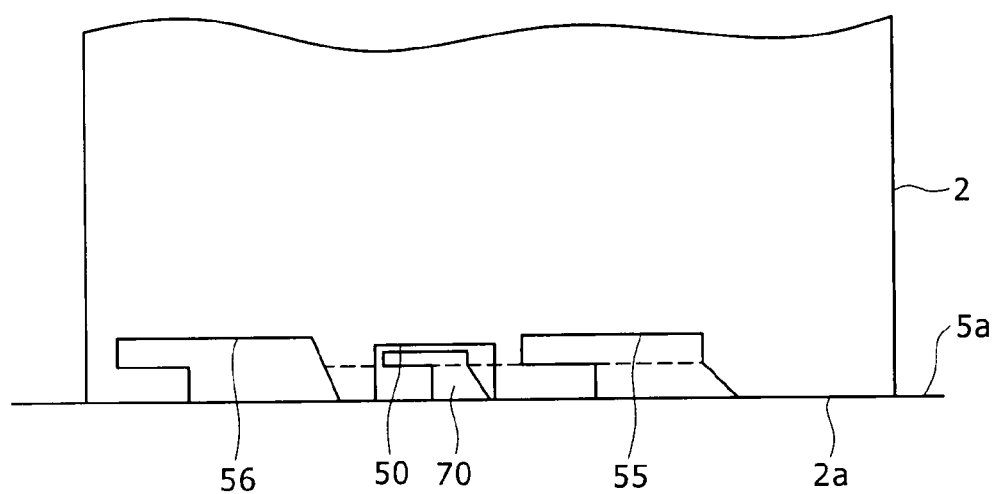

On the other hand, if the depth of the detection recess 50 is larger than the thickness of the clamped portions 58 and 62, as shown in FIG. 10B, the housing 2 can be inserted to the loading/unloading position where its lower surface 2a abuts on the bottom surface 5a of the battery mounting portion 5 even in the case where the lock protrusion 70 is erroneously inserted into the detection recess 50. As above-mentioned, the lock portions 72 of the lock protrusions 70 are necessary only to be capable of clamping the clamped portions 58 and 62 and may not necessarily be thick, and, therefore, they can be formed in a suppressed thickness. Accordingly, where the depth of the detection recess 50 is formed to be larger, if only a little, than the thickness of the clamped portions 58 and 62, the housing 2 can be inserted to the bottom surface 5a of the battery mounting portion 5 while the lock protrusion 70 is kept erroneously inserted in the detection recess 50.

However, in the present battery pack 1, the thickness of the clamped portions 58 and 62 is set to be larger than the depth of the detection recess 50, so that if the lock protrusion 70 is erroneously inserted in the detection recess 50, the housing 2 cannot be inserted to the bottom surface 5a of the battery mounting portion 5. Accordingly, the user can easily discriminate whether or not the housing 2 is erroneously inserted in the battery mounting portion 5.

Now, the depth of the detection recess 50 and the depths of the front surface side lock recess 55 and the back surface side lock recess 56 in the width direction of the lower surface 2a will be described below. As shown in FIG. 6, the housing 2 has a configuration in which the depth of the detection recess 50 in the width direction of the lower surface 2a, i.e., the depth of the detection recess(es) 50 in the lower surface 2a from the side surface(s) 2c and 2d in the direction orthogonal to the direction of sliding of the housing 2 between the loading/unloading position and the mounting position, is set to be larger than the depth of the front surface side lock recess 55 and the back surface side lock recess 56 in the same direction. As has been above-mentioned, the detection recess 50 is for engagement with the engaging protrusion 51 projectingly provided on the side wall of the battery mounting portion 5. In the large size battery pack 1a, both side surfaces 2c and 2d of the housing 2 are each provided with the detection recess 50, whereas in the small size battery pack 1b, only the other side surface 2d of the housing 2 is provided with the detection recess 50. Besides, the engaging protrusion 51 for engagement with the detection recess 50 is projectingly provided at each of those side surfaces of the battery mounting portion 5 of the electronic apparatus used with the large size battery pack 1a which face the side surfaces 2c and 2d of the housing 2; on the other hand, the detection recess 50 is projectingly provided only at that side surface of the battery mounting portion 5 of the electronic apparatus used with the small size battery pack 1b which faces the other side surface 2d of the housing 2.

Each of these engaging protrusions 51 is so formed that its protrusion amount from the side surface of the battery mounting portion 5 is roughly equal to the depth of the detection recess 50 in the width direction of the lower surface 2a. Therefore, when the engaging protrusion 51 is inserted in the detection recess 50, it is substantially entirely engaged in the detection recess 50. In addition, if a non-compatible small size battery pack 1b is about to be inserted in the battery mounting portion 5, the engaging protrusion 51 abuts on that one side surface 2c of the housing 2 which is not provided with the detection recess 50, whereby insertion of the non-compatible small size battery pack 1b into the battery mounting portion 5 is prevented.

Here, the protrusion amount of the engaging protrusion 51 is set to be approximately equal to the depth of the detection recess 50 in the width direction of the lower surface 2a, and the depth of the detection recess 50 is set to be larger than the depth of the lock recesses 55 and 56 in the same direction. In other words, the engaging protrusion 51 is formed to protrude by an amount larger than the depth of the lock recesses 55 and 56. Besides, the lock protrusions 70 are formed to have a protrusion amount according to the depth of the lock recesses 55 and 56 in the width direction of the lower surface 2a. Accordingly, the engaging protrusion 51 is formed to have a protrusion amount larger than that of the lock protrusion 70.

Therefore, as shown in FIG. 11A, when the small size battery pack 1b is mounted in the battery mounting portion 5 of an electronic apparatus for exclusive use with the large size battery pack 1a, the engaging protrusion 51 protruding from a side surface of the battery mounting portion 5 abuts on one side surface 2c of the housing 2. In this case, since the engaging protrusion 51 is formed to have a protrusion amount larger than that of the lock protrusions 70, the lock protrusions 70 are also not inserted into the lock recesses 55 and 56. Since none of the engaging protrusion 51 and the lock protrusions 70 is engaged with the detection recess 50 and the lock recesses 55 and 56, the housing 2 cannot be mounted into the battery mounting portion 5. Therefore, in the camcorder 7 or the like as shown in FIG. 5, for example, wherein the lower surface 2a is inserted in a horizontal direction, the housing 2 is not held by the battery mounting portion 5 even if it is being inserted, and it is difficult to slide the housing 2 toward the side of the front surface 2b. Therefore, the user can easily judge that the small size battery pack 1b is being erroneously inserted into the electronic apparatus for exclusive use with the large size battery pack 1a.

On the other hand, in the case where the depth of the detection recess 50 in the width direction of the lower surface 2a is set to be smaller than the depth of the lock recesses 55 and 56 in the same direction, the engaging protrusion 51 on the battery mounting portion 5 side is also formed to have a protrusion amount smaller than that of the lock protrusions 70. Therefore, as shown in FIG. 11B, where the small size battery pack 1b is mounted in the battery mounting portion 5 of an electronic apparatus for exclusive use with the large size battery pack 1a, the lock protrusions 70 would be inserted into the lock recesses 55 and 56 even if the engaging protrusion 51 abuts on the one side surface 2c. Accordingly, it is difficult for the user to judge that erroneous insertion of the battery pack 1 is occurring, and might irrationally slide the housing 2 toward the front surface 2b side so as to mount the housing 2 into the battery mounting portion 5.

In connection with this point, in the battery pack 1 based on the embodiment according to the present invention, the detection recess 50 is formed to be deeper than the lock recesses 55 and 56, so that the engaging protrusion 51 is also protruding more than the lock protrusions 70, and, when the engaging protrusion 51 abuts on the one side surface 2c, the lock protrusions 70 are also prevented from being inserted into the lock recesses 55 and 56. This ensures that, in the case of the battery pack 1, erroneous mounting of the small size battery pack 1b into the electronic apparatus for exclusive use with the large size battery pack 1a can be prevented.

Figure 12:
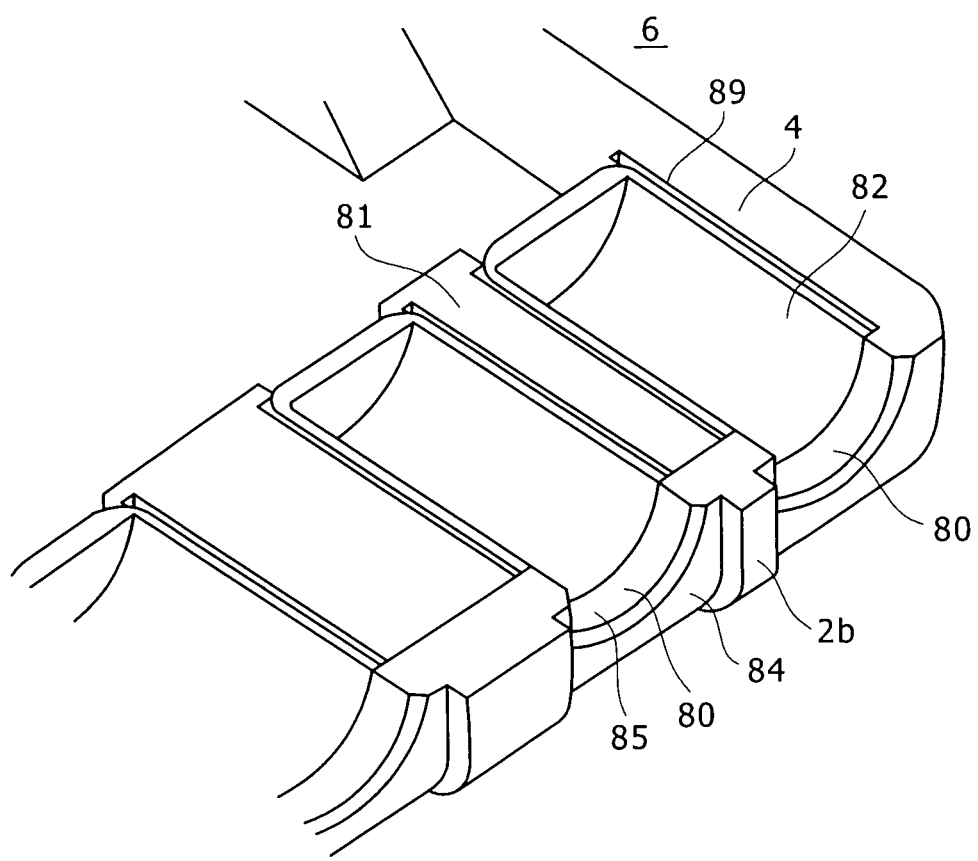
FIG. 12 is a perspective view showing terminal portions in a partly cut state.

Now, the terminal portions 6 formed at a lower portion of the front surface 2b of the housing 2 will be described below. As shown in FIG. 12, the terminal portion 6 includes a terminal hole 80 which is formed in the lower case 4 of the housing 2 and is made to front on the outer side of the front surface 2b, and a metallic bearing 82 which is fitted in a terminal case 81 disposed on the inside of the terminal hole 80 and in which the terminal pin 101 formed on the battery mounting portion 5 side is inserted.

Figure 13:
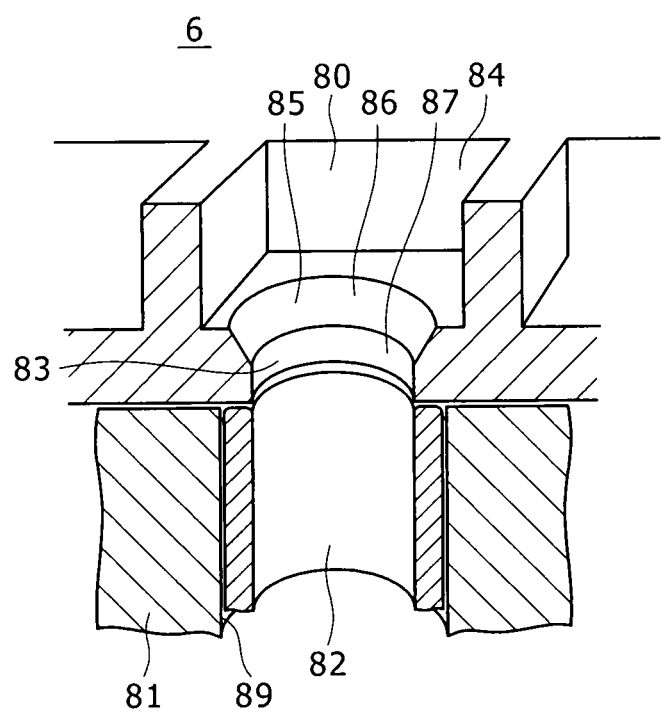
FIG. 13 is a perspective view showing the terminal portion in a partly cut state.

As shown in FIG. 13, the terminal hole 80 includes a recessed surface portion 84 provided with an insertion hole 83 in which the terminal pin 101 is inserted, and a guide portion 85 which is formed at the inner peripheral surface of the insertion hole 83 and which is continuous with the recessed surface portion 84 and the metallic bearing 82. The recessed surface portion 84 is a roughly rectangularly shaped recess formed in the front surface 2b of the housing 2, and a roughly central portion of the bottom surface thereof is opened in a circular shape to form the insertion hole 83 in which the terminal pin 101 is to be inserted. The guide portion 85 includes an inclined surface portion 86 which is formed at the inner peripheral surface of the insertion hole 83 and which guides the terminal pin 101 into the metallic bearing 82, and a support surface portion 87 which is formed to be substantially equal to the metallic bearing 82 in diameter and which supports the terminal pin 101 together with the metallic bearing 82.

The insertion hole 83 opened in the recessed surface portion 84 has an upper end opened to be larger in diameter than the terminal pin 101, so that the terminal pin 101 is easily inserted therein. Besides, the insertion hole 83 permits the terminal pin 101 to be inserted into the terminal portion 6 without any load thereon, through a process wherein the terminal pin 101 is guided through the inclined surface portion 86 formed on the upper end side of the insertion hole 83 into the support surface portion 87 which is formed to be roughly equal to the metallic bearing 82 in diameter and which is continuous with the metallic bearing 82.

Figure 14:
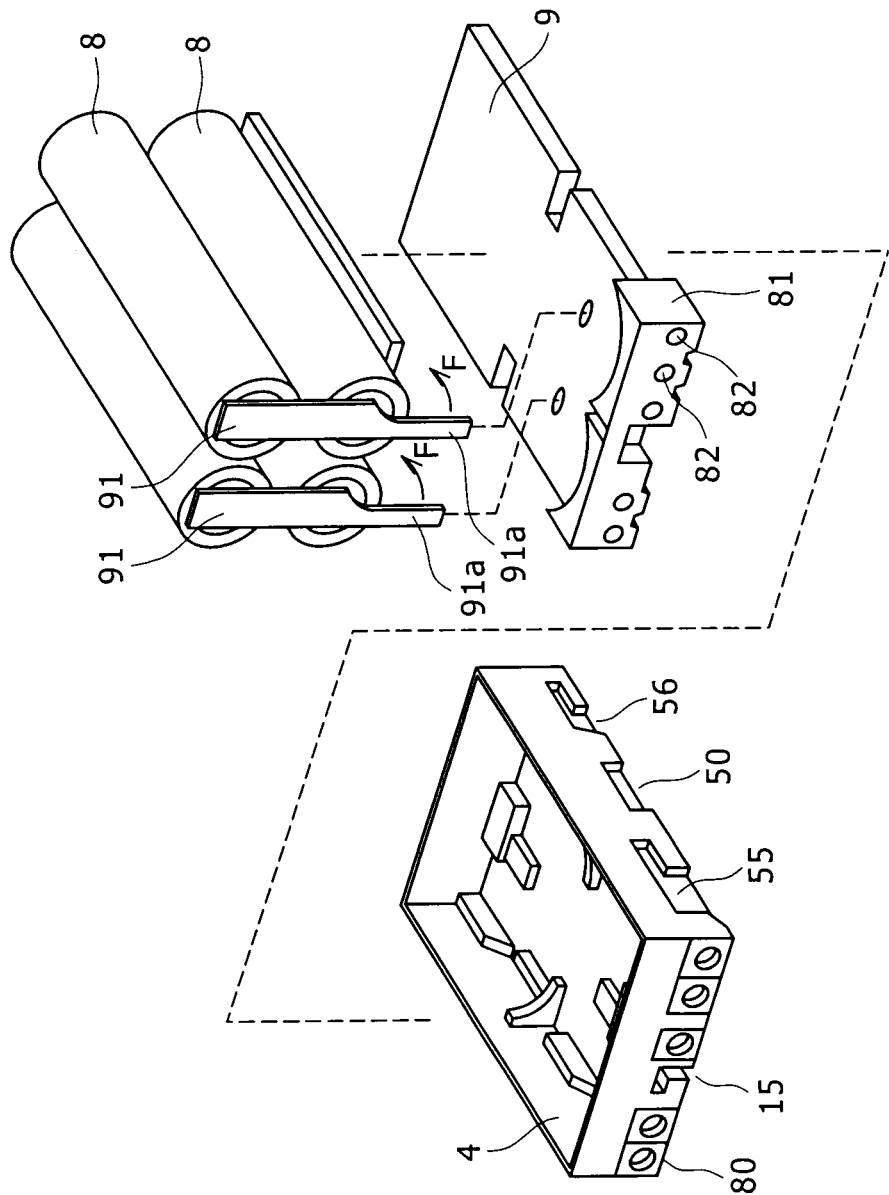
FIG. 14 is a perspective view showing the manner in which a terminal case connected to battery cells and the circuit board is contained in a lower case.

The metallic bearing 82 disposed in continuity with the support surface portion 87 is a hollow cylindrical metallic member of which one end in the longitudinal direction is opened and the other end is closed. The metallic bearing 82 is fitted in the terminal case 81, and is connected on its closed end side through a metallic tab 88 to the circuit board 9 connected with the terminal case 81 (see FIG. 17B). As shown in FIG. 14, the metallic bearing 82 is so configured that the terminal case 81 is disposed inside the lower case 4 together with the circuit board 9, whereby it is made to be continuous with the support surface portion 87 of the terminal hole 80 as shown in FIG. 12, for insertion and holding of the terminal pin 101 inserted in the insertion hole 83.

Figure 15:
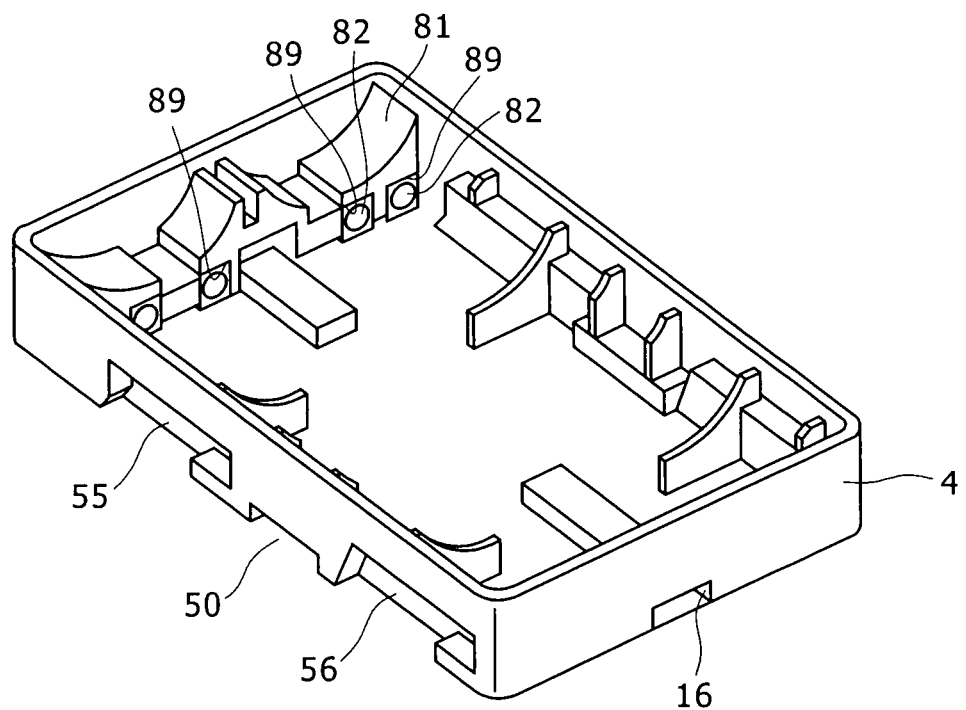
FIG. 15 is a perspective view of the terminal portions formed in the housing, as viewed from inside.

The terminal case 81 in which to fit the metallic bearing 82 is a roughly rectangularly shaped resin part formed to have a length in the longitudinal direction roughly equal to the length in the width direction of the lower case 4. As shown in FIGS. 15 and 12, the terminal case 81 is provided with fitting holes 89 for containing the metallic bearings 82 along the longitudinal direction thereof. The fitting hole 89 has a hollow cylindrical shape with an inside diameter roughly equal to the outer shape of the metallic bearing 82, and is opened at both ends in the longitudinal direction thereof. Each metallic bearing 82 is continued to the terminal hole 80 via an end face of the fitting hole 89, and is connected to the metallic tab 88.

In the terminal portion 6, the insertion hole 83 is opened inside the recessed surface portion 84 of the terminal hole 80, and is continued to the metallic bearing 82 through the guide portion 85, whereby the metallic bearing 82 is located on the inner side of the housing 2 relative to the front surface 2b. This ensures that, in the terminal portion 6, it is possible to prevent short-circuiting between the metallic bearing 82 and an external metal, deformation of the metallic bearing 82 due to collision against an external portion, or the like trouble.

In addition, in the terminal portion 6, the terminal pin 101 is inserted and held in the support surface portion 87 of the guide portion 85 of the terminal hole 80 and the metallic bearing 82 fitted in the terminal case 81. With the terminal pin 101 thus inserted and held in two component parts, namely, the terminal hole 80 on the lower case 4 side and the terminal case 81 disposed inside the lower case 4, even when a vibration is applied to the electronic apparatus at the time of mounting the battery pack 1, the load exerted on the terminal pin 101 can be lessened, and reliability of electrical connection can be maintained.

Figure 16:
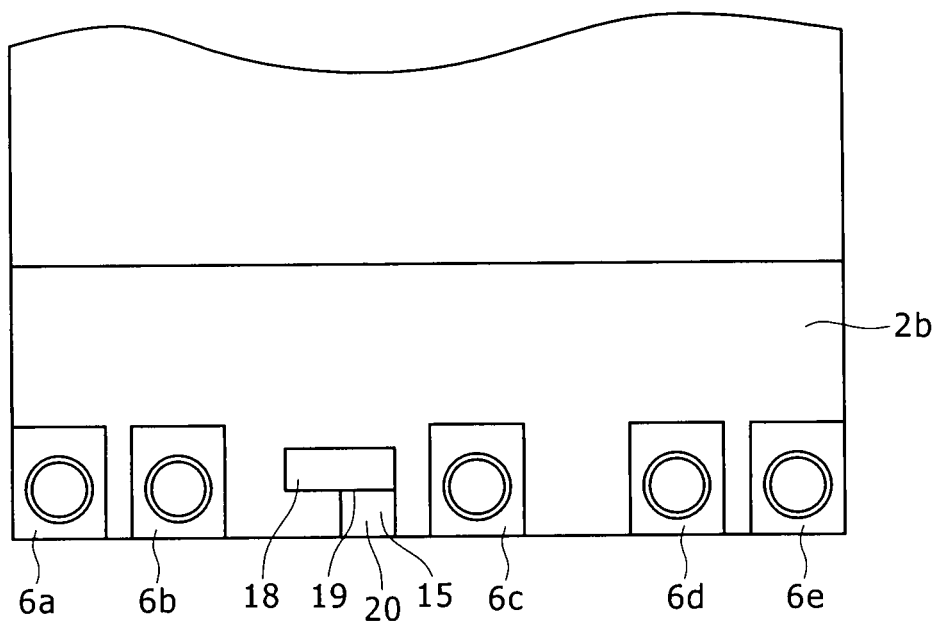
FIG. 16 is a front view of the terminal portions.

As shown in FIG. 16, the terminal portions 6 include first to fifth terminal portions 6a to 6e arrayed at a lower portion of the front surface 2b. The first and second terminal portions 6a and 6b and the fourth and fifth terminal portions 6d and 6e are formed symmetrically on left and right sides at the front surface 2b of the housing 2, and the third terminal portion 6c is formed at a position deviated from the center of the front surface 2b toward the side of the fourth and fifth terminal portions 6d and 6e. In addition, an end face of the above-mentioned front surface side insertion guide groove 15 is made to front on the center of the front surface 2b.

In addition, as above-mentioned, the terminals formed at the terminal portions 6a to 6e have respectively predetermined functions. Specifically, the first terminal portion 6a is a positive electrode terminal of the battery pack 1, the second terminal portion 6b is a clock line terminal in the SMBus line, the third terminal portion 6c is a data line terminal in the SMBus line, the fourth terminal portion 6d is an ID terminal with an ID resistance connected thereto, and the fifth terminal portion 6e is a negative electrode terminal of the battery pack 1.

In using the battery pack 1, the housing 2 is inserted into the battery mounting portion 5 and is slid toward the front surface 2b side, whereby the terminal pins 101 disposed on the battery mounting portion 5 side are inserted into and held in the terminal portions 6a to 6e. As a result, between the battery pack 1 and the electronic apparatus side, electric power can be supplied through the first and fifth terminal portions 6a and 6e; clock data can be communicated through the second terminal portion 6b; a variety of data such as residual battery capacity, fully charged capacity, present charged capacity, the possible serviceable time from now on under the present use condition, number of charge-discharge cycles, etc. and ID data indicating that the battery pack 1 is a genuine product, and so on can be communicated through the third terminal portion 6c; and the ID resistance can be detected through the fourth terminal portion 6d.

The ID resistance detected through the fourth terminal portion 6d is used for detecting, on the electronic apparatus side, which of a plurality of types of battery packs prepared according to the difference(s) in capacity has been mounted; specifically, different resistances are set correspondingly to the large size battery packs 1a and the small size battery packs 1b. When the terminal pin 101 is inserted into the fourth terminal portion 6d, the resistance on the battery pack 1 side is measured, on the electronic apparatus side, and it is judged which of the different types of battery packs 1 has been mounted.

Here, the fourth terminal portion 6d is formed proximate to the fifth terminal portion 6e which constitutes the negative electrode terminal. It is based on the fact that, if the ID detecting resistor and the negative electrode line are remote from each other, electromagnetic radiation from signal lines or the like therebetween is propagated as noise, possibly hampering accurate measurement of resistance. Therefore, in the battery pack 1, with the fourth terminal portion 6d arranged proximate to the negative electrode terminal 6e, the distance between the ID resistor and the negative electrode line can be designed to be short, accurate measurement of resistance can be achieved.

In addition, the third terminal portion 6c is formed at a position deviated from the center in the width direction of the front surface 2b of the housing 2 toward either of the left and right sides, in this embodiment, toward the side of the fourth and fifth terminal portions 6d and 6e, in view of the presence of the front surface side insertion guide groove 15 in a substantially central position in the width direction of the front surface 2b.

As a result, in the battery pack 1, the terminal portions 6a to 6e are arranged at irregular intervals, and the terminal pins 101 formed on the battery mounting portion 5 side correspondingly to the terminal portions 6a to 6e are also arranged at irregular intervals, accordingly. Therefore, when the battery pack 1 is inappropriately in a left-right reversed state, the terminal pins 101 cannot be inserted into the terminal portions, so that the battery pack 1 can be prevented from being erroneously inserted into the battery mounting portion 5 in the left-right reversed state.

Besides, between the second terminal portion 6b and the third terminal portion 6c and between the third terminal portion 6c and the fourth terminal portion 6d, a pair of electrode tabs 91 connected to the electrodes of the battery cells 8 are extended so as not to overlap with any of the third and fourth terminal portions 6c and 6d. As shown in FIG. 14, the electrode tabs 91 connected to the electrodes of the battery cells 8 are formed to be narrower on the side of tip portions 91a thereof. When the battery cells 8 are contained into the housing 2, the tip portions 91a are bent into the direction of arrows F in the figure, before connection thereof to the circuit board 9. With the battery cells 8 contained in the housing 2 together with the circuit board 9, as shown in FIG. 17A, the tip portions 91a of the electrode tabs 91 are extended in positions which are located between the second terminal portion 6b and the third terminal portion 6c and between the third terminal portion 6c and the fourth terminal portion 6d and which are not on the same plane as the terminal portions 6a to 6e.

Figure 17A:
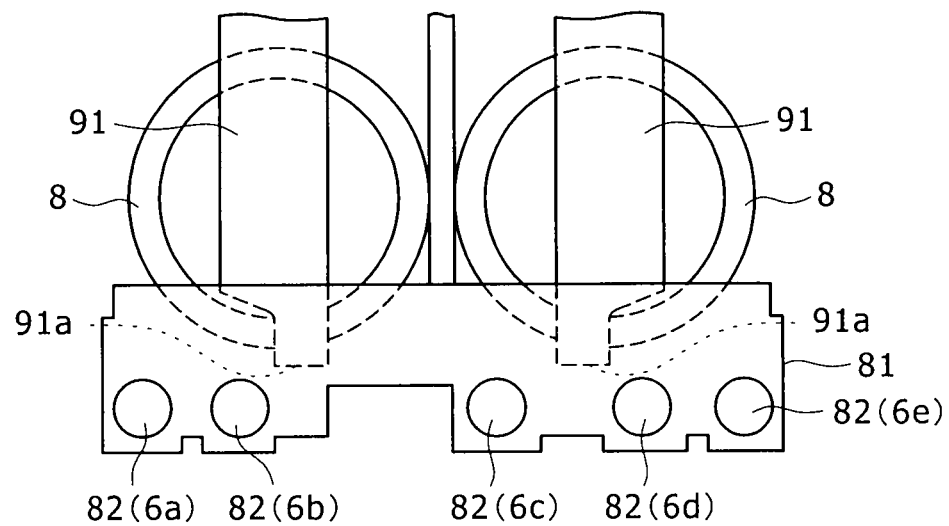
Figure 17B:
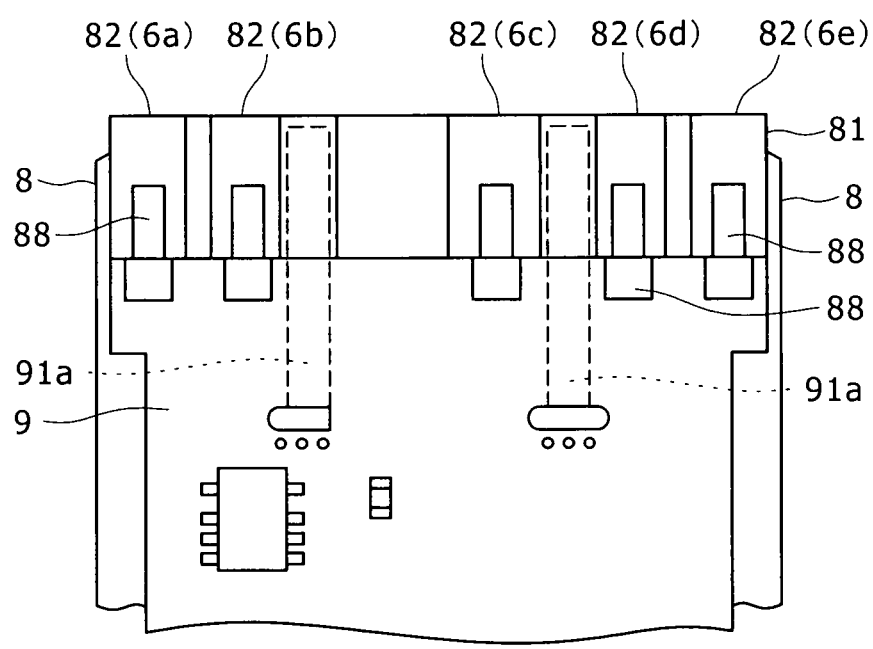

Incidentally, FIG. 17A is a front view showing the battery cells 8 disposed on the circuit board 9 connected to a terminal case 81, and FIG. 17B is a bottom view of the same condition as viewed from the back side of the circuit board 9. As shown in FIG. 17B, the electrode tab 91 is bent from an end portion of the battery cell 8 into the direction of the arrow F along the circuit board 9, whereby the narrower tip portion 91a thereof is laid around so as not to overlap with any of the second to fourth terminal portions 6b to 6d. Therefore, in the battery pack 1, it is possible to prevent electromagnetic radiations due to the electrode tabs 91 from being propagated as noise to the communication lines, and accurate data communication can be carried out.

Figure 18:
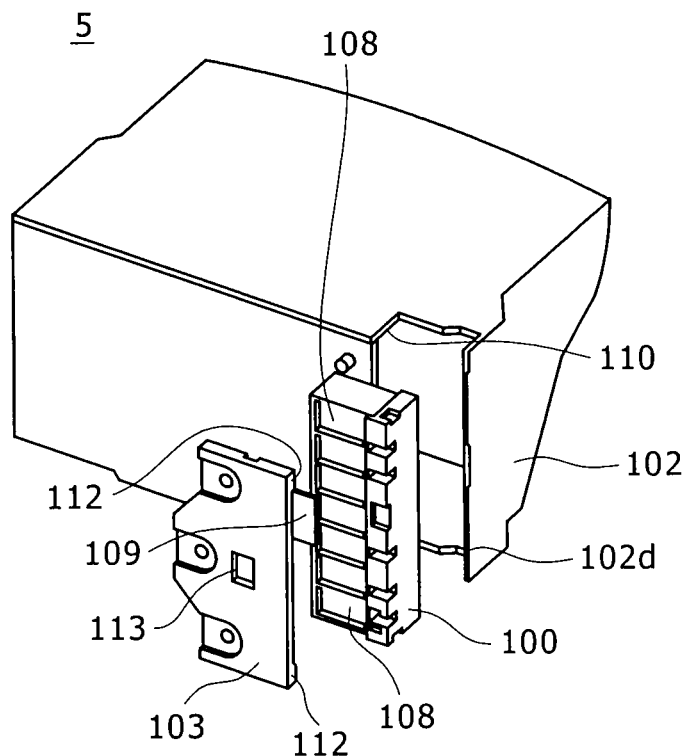
FIG. 18 is an exploded perspective view of a battery containing portion.
Figure 19:
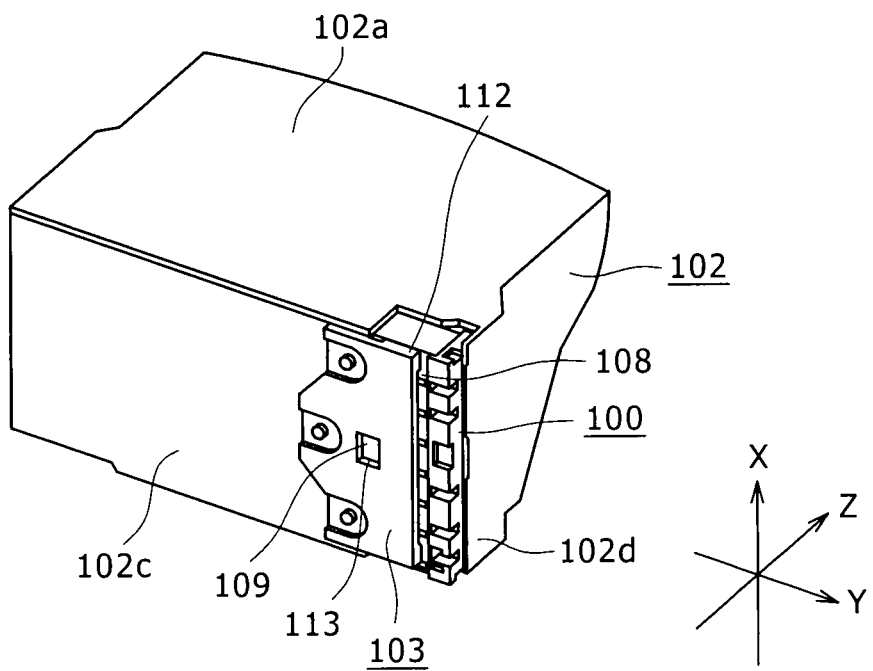
FIG. 19 is a perspective view of the battery containing portion.

Now, the battery mounting portion 5 having the terminal pins 101 to be inserted in the terminal portions 6a to 6e will be described below. As shown in FIGS. 18 and 19, the battery mounting portion 5 includes a terminal board 100 having the terminal pins 101 to be inserted in the terminal portions 6 fronting on the front surface 2b of the housing 2, a containing case 102 which contains the housing 2 therein and in which the terminal board 100 is fitted, and a support plate 103 for supporting the terminal board 100 fitted in the containing case 102.

Figure 20A:
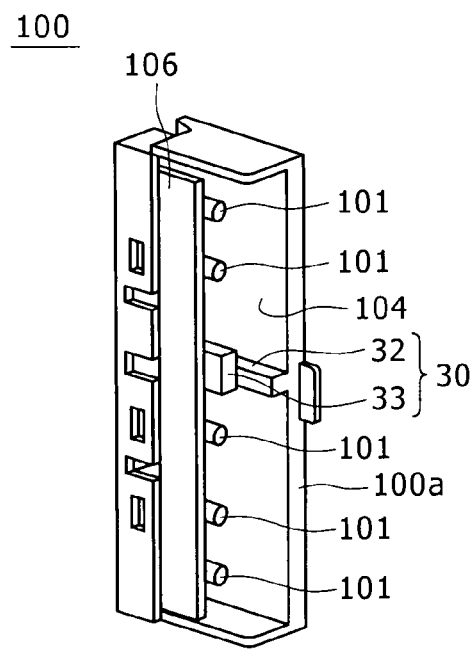
Figure 20B:
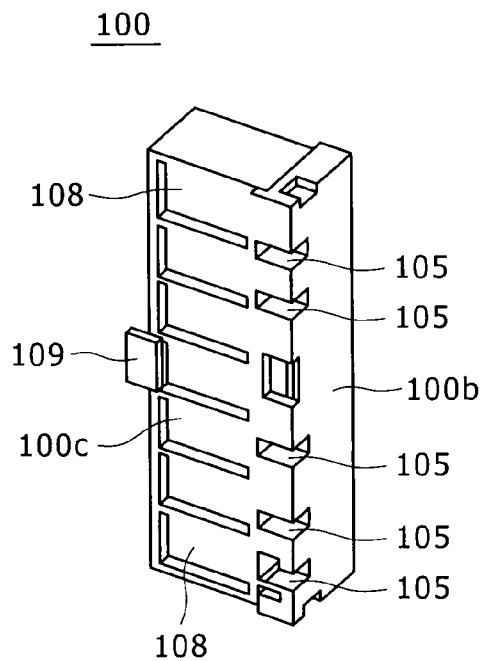

As shown in FIGS. 20A and 20B, the terminal board 100 has a roughly rectangular overall shape, and on the side of its one surface 104 fronting on the inside of the containing case 102, the terminal pins 101 are projectingly provided correspondingly to the number and intervals of the terminal portions 6 provided on the battery pack 1 side. Of each of the terminal pins 101, the base end side is supported by a support recess (not shown) provided in the terminal board 100, and the tip is directed toward the side of a front surface 100a of the terminal board 100 which faces the front surface 2b of the housing 2. In addition, each of the terminal pins 101 is connected to a terminal cord passed through the support recess. Incidentally, as shown in FIG. 20B, each terminal cord is led out to the exterior of the containing case 102 through a lead-out recess 105 formed on the side of a back surface 100b of the terminal board 100.

In addition, substantially in the center in the width direction of the one surface 104 of the terminal board 100, the above-mentioned front surface side guide protrusion 30 is formed adjacently to the terminal pins 101. The front surface side guide protrusion 30 is inserted in the front surface side insertion guide groove 15 formed in the lower surface 2a of the housing 2, so as thereby to guide the loading and unloading of the housing 2 into and from the battery mounting portion 5 and to prevent the housing 2 from chattering in the direction of both side surfaces 2c and 2d and the direction of the upper and lower surfaces 2f and 2a when the housing 2 is mounted in the battery mounting portion 5. The front surface side guide protrusion 30 is provided with the front surface side protruding bar 32 and the lock protrusion 33.

Incidentally, a shielding plate 106 for protecting the terminal pins 101 is turnably mounted onto the one surface 104 of the terminal board 100. The shielding plate 106 is provided for preventing the terminal pins 101 from contact with a conductor, breakage or the like by being exposed to the exterior in the case where the battery pack 1 is not mounted, and is an elongate plate member disposed on the one surface 104 along the array direction of the terminal pins 101. The shielding plate 106 is supported to be turnable, with the back surface 100b side as a fulcrum. In addition, the shielding plate 106 is locked to a coil spring (not shown), whereby it is normally biased for turning in such a direction as to shield the terminal pins 101. This ensures that when the battery pack 1 is not yet mounted, the shielding plate 106 shields the terminal pins 101 from the exterior, and when the battery pack 1 is mounted, the shielding plate 106 is pushed by the front surface 2b of the housing 2 and turned toward the side of the back surface 100b, thereby exposing the terminal pins 101.

In addition, the terminal board 100 is provided in its bottom surface 100c with support recesses 108 brought into contact with support protrusions 112 of the support plate 103. The terminal board 100 is supported on the support protrusions 112 of the support plate 103, with some clearance therebetween, whereby it is supported to be swingable in the direction of the bottom surface 100c. Besides, the terminal board 100 is provided on its bottom surface 100c with a lock piece 109 to be locked on the bottom surface 102c of the containing case 102.

Figure 21:
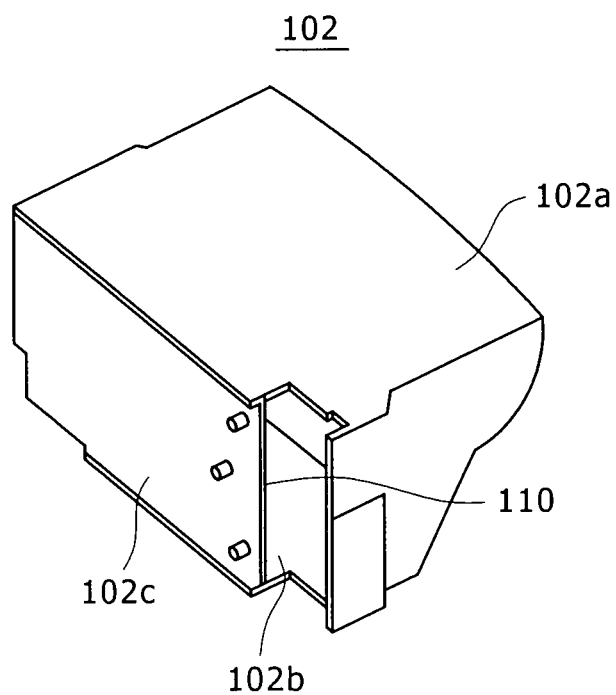
FIG. 21 is a perspective view of a containing case.

As shown in FIG. 21, the containing case 102 in which to contain the terminal board 100 as above is formed to be slightly larger than the housing 2 of the battery pack 1, and has a roughly rectangular box-like shape opened on the upper side where the housing 2 is loaded and unloaded. In addition, the containing case 102 is projectingly provided with the above-mentioned lock protrusions 70 and the above-mentioned engaging protrusion 51 on its side walls 102a and 102b which respectively face the side surfaces 2c and 2d of the housing 2. Further, as shown in FIG. 8, the turning mechanism 40 for turning the lock piece 35 engaged with the lower surface 2a of the housing 2 is disposed at the back wall, facing the back surface 2e of the housing 2, of the containing case 102.

The containing case 102 is provided in its bottom surface 102c (which constitutes the bottom surface 5a of the battery mounting portion 5) and both side walls 102a and 102b with a fitting hole 110 in which to fit the terminal board 100. The fitting hole 110 has its bottom surface 102c opened in a roughly rectangular shape, and has its side walls 102a and 102b each opened also in a rectangular shape so as to be continuous with the opening in the bottom surface 102c. The terminal board 100 is inserted into the containing case 102 through the bottom surface 102c, and its bottom surface 100c is supported on both sides thereof by the side walls 102a and 102b of the containing case 102, whereby the terminal board 100 is fitted in the fitting hole 110. In this case, the lock piece 109 of the terminal board 100 is locked on the bottom surface 102c of the containing case 102.

As a result, of the terminal board 100, the one surface 104 provided with the terminal pins 101 is made to front on the inside of the containing case 102. In addition, when the terminal board 100 is fitted in the fitting hole 110, it is supported on the bottom surface 100c side thereof by the support plate 103.

Figure 22:
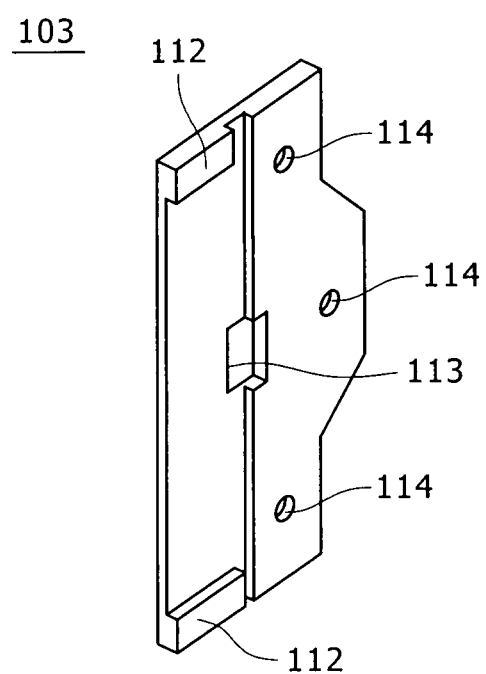
FIG. 22 is a perspective view of a support plate.

As shown in FIG. 22, the support plate 103 is a resin part formed in a roughly rectangular plate-like shape, and is attached to the bottom surface 102c of the containing case 102 in a cantilever manner, thereby supporting the terminal board 100 in the fitting hole 110. The support plate 103 is provided, on its surface facing the terminal board 100, with support protrusions 112 to be brought into contact with the support recesses 108 of the terminal board 100. In addition, the support plate 103 is provided with an opening 113, correspondingly to the lock piece 109 of the terminal board 100, and is provided with a plurality of attaching holes 114 for attachment to the bottom surface 102c of the containing case 102.

When the terminal board 100 is fitted in the fitting hole 110, the support plate 103 is attached to the containing case 102 from the upper side of the terminal board 100, thereby to support the terminal board 100.

In this case, the support recesses 108 are formed to be wider than the support protrusions 112, and none of the side walls of the support recesses 108 makes contact with the support protrusions 112. In addition, the fitting hole 110 is opened on the sides of the side surfaces 102a and 102b of the containing case 102. Therefore, the terminal board 100 can be swung in the direction of an arrow X in FIG. 19. The swinging range of the terminal board 100 in the direction of the arrow X is restricted by the contact of one of the side walls of the support recesses 108 with the support protrusion 112 or by the contact of the lock piece 109 with the opening 113.

Besides, support plate 103 is so formed as to leave some clearance between the tip surface of the support protrusion 112 and the bottom surface of the support recess 108. In addition, the support plate 103 is supported on the containing case 102 in a cantilever manner, and has some flexibility. Therefore, the terminal board 100 can be swung also in the direction of an arrow Z in FIG. 19. The swinging range of the terminal board 100 in the direction of the arrow Z is restricted by the contact of the bottom surfaces of the support recesses 108 with the tip surfaces of the support protrusions 112 or by the support thereof in the fitting hole 110 formed in the side walls 102a and 102b of the containing case 102.

Further, the containing case 102 is formed as a resin part. In addition, the containing case 102 is provided with the fitting hole 110 also in its front wall 102d, facing the back surface 100b of the terminal board 100, and its side walls 102a and 102b, whereby the front end of the containing case 102 is made to be a free end and to have some flexibility. Therefore, the terminal board 100 can be swung also in the direction of an arrow Y in FIG. 19. The swinging range of the terminal board 100 is restricted by the flexing range of the front wall 102d of the containing case 102.

Thus, the battery pack 1 is so formed that the terminal board 100 can be swung in three directions, namely, in the directions of the arrows X, Y and Z in FIG. 19. This ensures that even when the battery pack 1 mounted in the battery mounting portion 5 is swung due to swinging of the electronic apparatus main body, the terminal board 100 is swung following up to the battery pack 1, keeping the terminal portions 6 and the terminal pins 101 in connection with each other. Therefore, generation of gap at contact points between the terminal portions 6 and the terminal pins 101 is obviated, whereby failure in connection can be prevented. In addition, sliding is prevented from occurring between the terminal portions 6 and the terminal pins 101, so that these parts can be prevented from being broken or deteriorated.

In addition, the terminal board 100 can be swung in the direction of the arrow X in FIG. 19, since both the side walls 102a and 102b of the containing case 102 are opened. Therefore, where the battery pack 1 is mounted in the battery mounting portion 5 of the camcorder 7, the terminal board 100 can be swung in the vertical direction in which the camcorder 7 is frequently swung. Accordingly, even if the battery pack 1 is swung in the vertical direction in use of the camcorder 7, the reliability of connection between the terminal portions 6 of the battery pack 1 and the terminal pins 101 of the battery mounting portion 5 would not be spoiled.

Incidentally, the battery mounting portion 5 is not limited to the configuration in which the containing case 102 is used for fitting the terminal board 100 and the support plate 103 therein. For example, a configuration may be adopted in which a battery containing portion is formed in the main body of the electronic apparatus, and the terminal board 100 and the support plate 103 are fitted in the battery containing portion.

Now, a residual capacity displaying function of the battery pack 1 will be described. Since the battery pack 1 is planned to be used in a business-use camcorder 7, the battery pack 1 is designed to have an increased battery capacity and to be capable of being used for a prolonged time. Here, when the business-use camcorder 7 is used, a plurality of spare battery packs 1 are prepared, and when one battery has run down, it is replaced with another, and shooting is continued. In this case, the residual capacities (residual charges) of the spare battery packs 1 are confirmed, whereby it is possible to select a spare battery pack with more residual capacity and to discriminate unused battery packs from the exhausted battery pack(s) 1.

The battery pack 1 has such a residual capacity display unit 120 formed on the upper surface 2f of the housing 2. As shown in FIGS. 1 and 23, the residual capacity display unit 120 includes display windows 121 to be turned ON for indicating the residual capacity of the battery pack 1, a residual capacity display switch 122 for turning ON the display window(s) 121, detecting means 123 for detecting the depressed state of the residual capacity display switch 122, and control means 124 for controlling the ON/OFF conditions of the display windows 121 according to the results of detection by the detecting means 123. The residual capacity display unit 120 changes over the ON/OFF conditions of the display windows 121 according to the time for which the residual capacity display switch 122 is depressed, whereby the convenience in use by the user is enhanced.

The display windows 121 have LEDs incorporated therein, and the LEDs are individually turned ON or OFF according to the residual battery capacity. As shown in FIG. 24, for example, four display windows 121 are provided side by side at the upper surface 2f of the housing 2, and the ON/OFF conditions of the LEDs at the display windows 121 are controlled as follows. When the residual battery capacity (absolute residual capacity ratio) is less than 20%, all the four LEDs are turned OFF; when the residual capacity is 20 to 39%, only the left end LED is turned ON; when the residual capacity is 40 to 59%, the two left-side LEDs are turned ON; when the residual capacity is 60 to 79%, the three left-side LEDs are turned ON; and when the residual capacity is 80 to 100%, all the four LEDs are turned ON.

The residual capacity display switch 122 is formed at the upper surface 2f of the housing 2, adjacently to the display windows 121. The time for which the residual capacity display switch 122 has been depressed by the user is detected by the detecting means 123. The control means 124 controls the ON time of the LEDs in the display windows 121, according to the time for which the residual capacity display switch 122 has been depressed. For example, when the time for which the residual capacity display switch 122 has been depressed is 0.5 second or less, the display window(s) 121 are turned ON for 1 second; and when the time for which the residual capacity display switch 122 has been depressed is more than 0.5 second, the display window(s) 121 are turned ON for 5 second.

The detecting means 123 for detecting the time for which the residual capacity display switch 122 has been depressed and the control means 124 for controlling the ON time of the display windows 121 are provided on a circuit board (see FIG. 2) disposed on the upper surface 2f side in the inside of the housing 2, or on the circuit board 9 connected to this circuit board through a flexible wiring board.

In the residual capacity display unit 120, as shown in FIG. 25, the control means 124 monitors the ON/OFF states of the LEDs (step S1). Where all the LEDs are OFF, the control means 124 determines whether or not the residual capacity display switch 122 has been depressed (step S2). Where the residual capacity display switch 122 has not been depressed, the control means 124 again monitors the ON/OFF states of the LEDs, and where the residual capacity display switch 122 has been depressed, the control means 124 determines whether or not the residual capacity ratio of the battery pack 1 is less than 20% (step S3). Where the residual capacity ratio of the battery pack 1 is less than 20%, the control means 124 keeps all the LEDs in the OFF state, and where the residual capacity ratio is 20% or more, the control means 124 turns ON the display window(s) 121 according to the residual capacity ratio, followed by returning to the monitoring of the ON/OFF states of the LEDs (step S4).

When it is found in step S1 that the LED(s) at the display window(s) 121 is ON, the control means 124 determines whether or not the residual capacity display switch 122 has been depressed for 0.5 second or less (step S5). Then, where the time for which the residual capacity display switch 122 has been depressed is 0.5 second or less, the control means 124 determines whether or not the LED ON condition has continued for 1 second (step S6). Where the LED ON condition has not continued for 1 second, the control means 124 maintain the ON state of the LED(s), and where the LED ON condition has continued for 1 second or above, the control means 124 turns OFF the LED(s), followed by returning to the monitoring of the ON/OFF states of the LEDs (step S7).

When it is found in step S5 that the residual capacity display switch 122 has been depressed for more than 0.5 second, the control means 124 determines whether or not the LED ON condition at the display window(s) 121 has continued for 5 second (step S8). Where the LED ON condition has not continued for 5 second, the control means 124 maintains the LED ON condition, and where the LED ON condition has continued for 5 second, the control means 124 turns OFF the LED(s), followed by returning to the monitoring of the ON/OFF states of the LEDs (step S9).

Thus, in the residual capacity display unit 120, the ON time of the display window(s) 121 differs depending on the time for which the residual capacity display switch 122 is depressed. For example, in the case of sequentially checking the residual battery capacity ratios of a plurality of spare battery packs 1, it takes much time to check the residual battery capacity ratios one by one. In such a case, therefore, the plurality of spare battery packs 1 may be arranged in a row, and the residual capacity display switch 122 may sequentially be depressed for a long time so as to turn ON the display window(s) 121 for 5 second or more, whereby the residual capacity ratios can be confirmed efficiently.

Incidentally, the time for which the residual capacity display switch 122 is depressed for the purpose of prolonging the ON time of the display window(s) 121 is not limited to 0.5 second but may be changed, as required. In addition, the ON time of the display window(s) 121 prolonged when the residual capacity display switch 122 is depressed for a long time is not limited to 5 second but may be changed, as required.

Besides, the change made in the ON/OFF state of the display window(s) 121 when the residual capacity display switch 122 is depressed for a long time is not limited to the prolonging of the ON time but may, for example, be an increase in the luminance of the LED(s) in the display window(s) 121. When the luminance of the LED(s) in the display window(s) 121 is enhanced, it is possible to enhance the visibility of the display windows 121 in a light environment, such as outdoors in daytime.

Further, the change made in the ON/OFF state of the display window(s) 121 when the residual capacity display switch 122 is depressed for a long time is not limited to the prolonging of the ON time but may, for example, be blinking of the LED(s) in the display window(s) 121, whereby it is also made possible to enhance the visibility of the display windows 121. In addition, if the blinking is adopted when the ON time is prolonged, the power consumption for emitting light can be suppressed. Incidentally, the control means 124 may blink the LEDs in the display windows 121 also when the residual capacity display switch 122 is not depressed for a long time, which also enhances the visibility of the display windows 121.

Besides, the operation of the residual capacity display unit 120 is not limited to the four-stage display of the display windows 121 but may be set otherwise, as required. Furthermore, where the residual battery capacity is less than 20%, the color(s) of the LED(s) in the ON state or blinking state may be changed so as to make a display in four stages (20 to 15%, 15 to 10%, 10 to 5%, and below 5%).

It should be understood by those skilled in the art that various modifications, combinations, sub-combinations and alterations may occur depending on design requirements and other factors insofar as they are within the scope of the appended claims or the equivalents thereof.

What is claimed is:

1. A battery pack which is loaded and unloaded to and from a battery mounting portion on an electronic apparatus by sliding a housing of the battery pack on said battery mounting portion, the battery pack comprising:
   said housing, said housing including
      a pair of lock recesses for engagement with a corresponding lock protrusion, the corresponding lock protrusion formed to protrude from said battery mounting portion, each lock recess formed in each of side surfaces adjacent to a mount surface for mounting to said battery mounting portion, the side surfaces adjacent to the mount surface along a pair of side edges parallel to a sliding direction of said mount surface, and
      a detection recess for engagement with a protrusion, the protrusion formed to protrude from said battery mounting portion, the detection recess formed so as to detect a kind of said battery pack, the detection recess formed in one or each of said side surfaces according to the kind of said battery pack, and
   each lock recess including
      an inclined surface portion for drawing in said corresponding lock protrusion;
      an orthogonal surface portion having a lower end connected to an upper end of the inclined surface portion and extending in a height direction substantially orthogonal to the mount surface such that the inclined surface portion is located between the mount surface and the orthogonal surface portion; and
      a clamped portion to be clamped between a bottom surface of said battery mounting portion and said corresponding lock protrusion through sliding of said housing in said battery mounting portion, the clamped portion including only a protrusion extending along the sliding direction that is received between the corresponding lock protrusion and the battery mounting portion when the battery pack is mounted on the electronic apparatus.

2. The battery pack as set forth in claim 1, wherein said lock recess and said detection recess are formed in one or each of edge portions formed between said mount surface and both side surfaces.

3. The battery pack as set forth in claim 1, wherein said battery pack with a first capacity is provided with said detection recess in each of both side surfaces, the battery pack with a second capacity is provided with said detection recess in only one of said side surfaces, the second capacity being lower than the first capacity.

4. The battery pack as set forth in claim 1, wherein a thickness of said clamped portion in a height direction substantially orthogonal to said mount surface is set to be larger than a depth of said detection recess in the height direction.

5. The battery pack as set forth in claim 1, further comprising:
  a circuit board inside said housing, the circuit board being supported inside the housing by a meeting point of an inner side of the orthogonal surface portion and an inner side of the inclined surface portion.

* * * * *